Nov. 22, 1955  K. E. DAVIS ET AL  2,724,158
APPARATUS FOR MAKING MOLD SHELLS
Filed Nov. 22, 1952  20 Sheets-Sheet 1

*INVENTORS*
Kenneth E. Davis
William A. Weightman
BY Maurice A. Crews
*ATTORNEY*

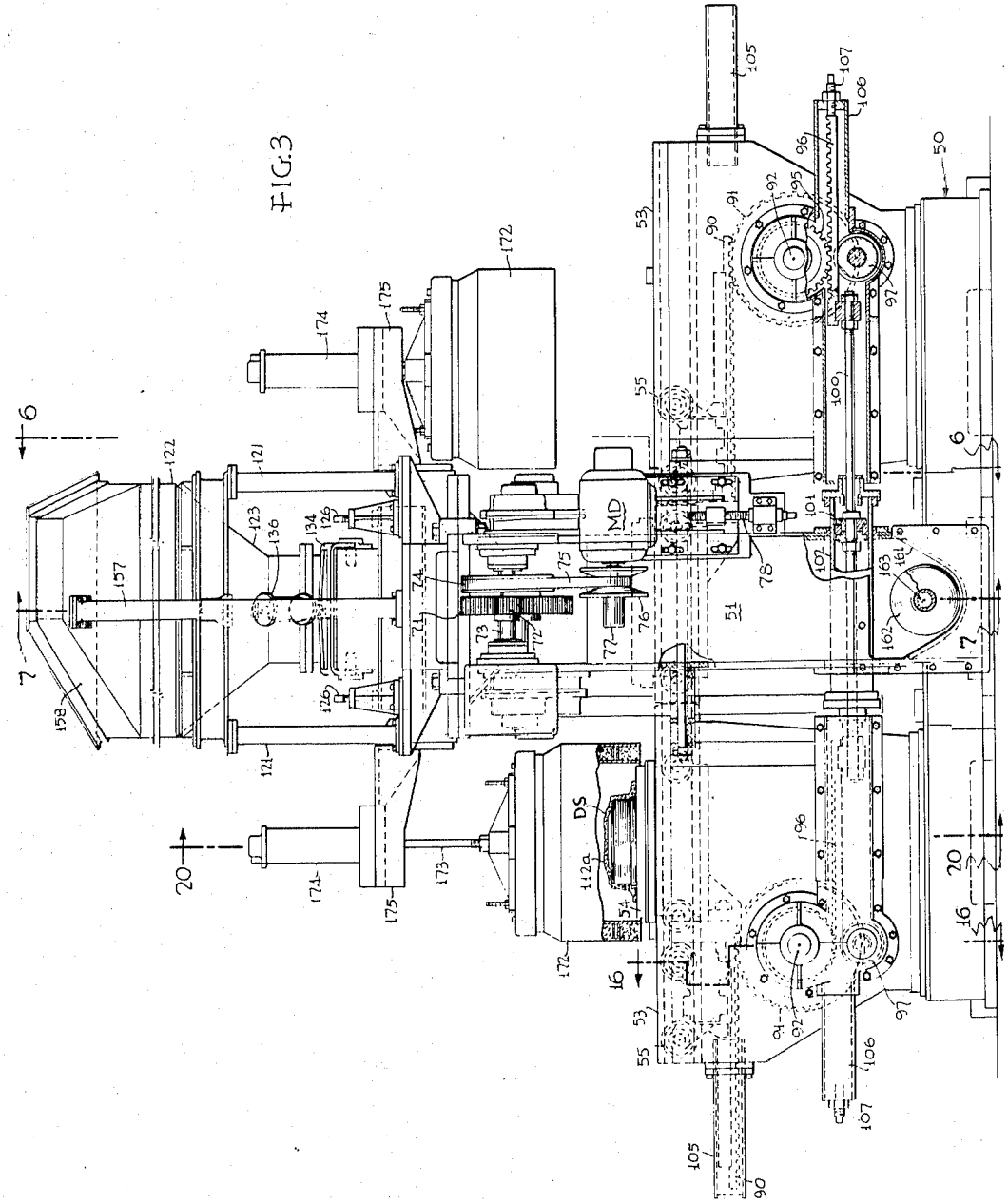

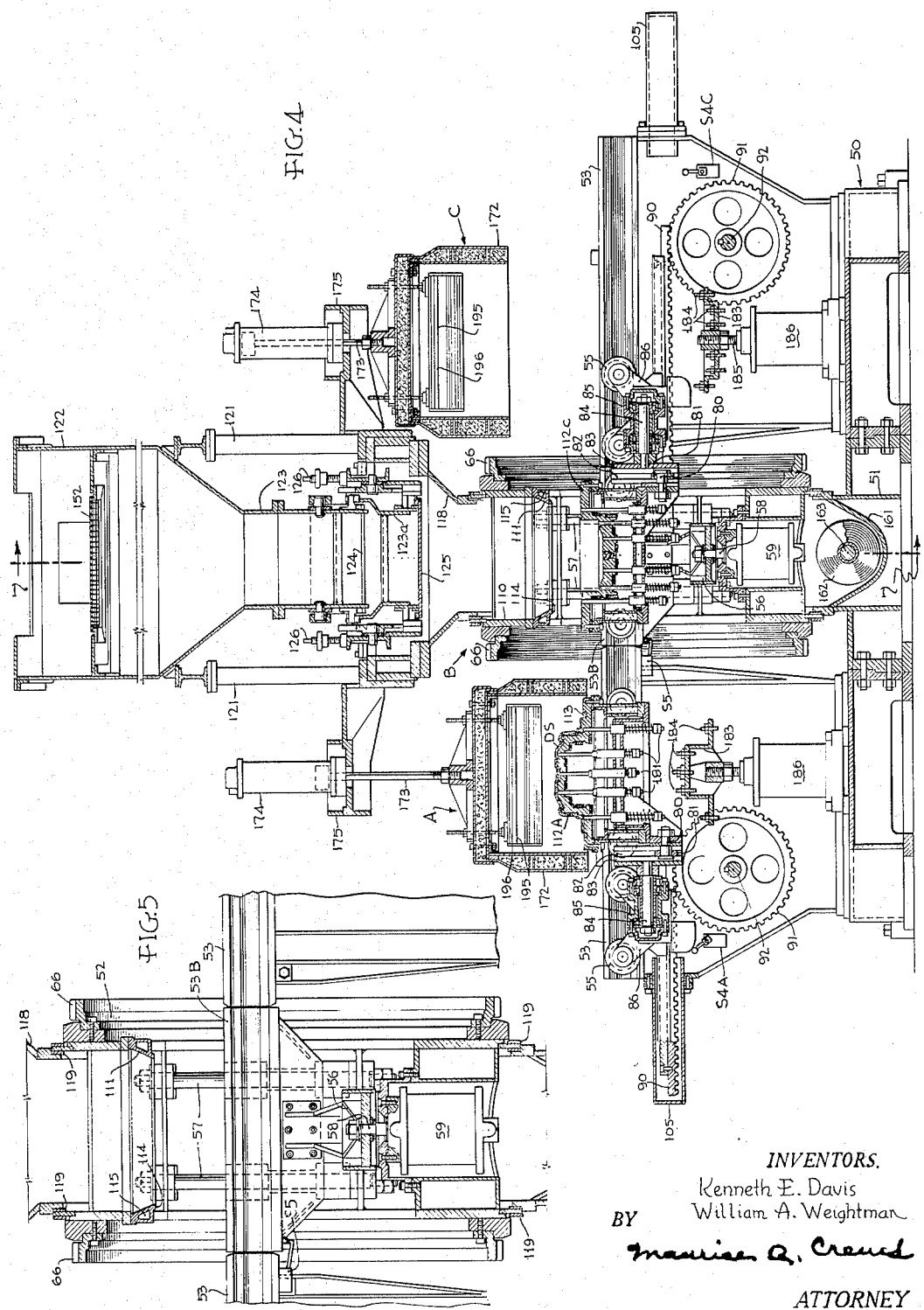

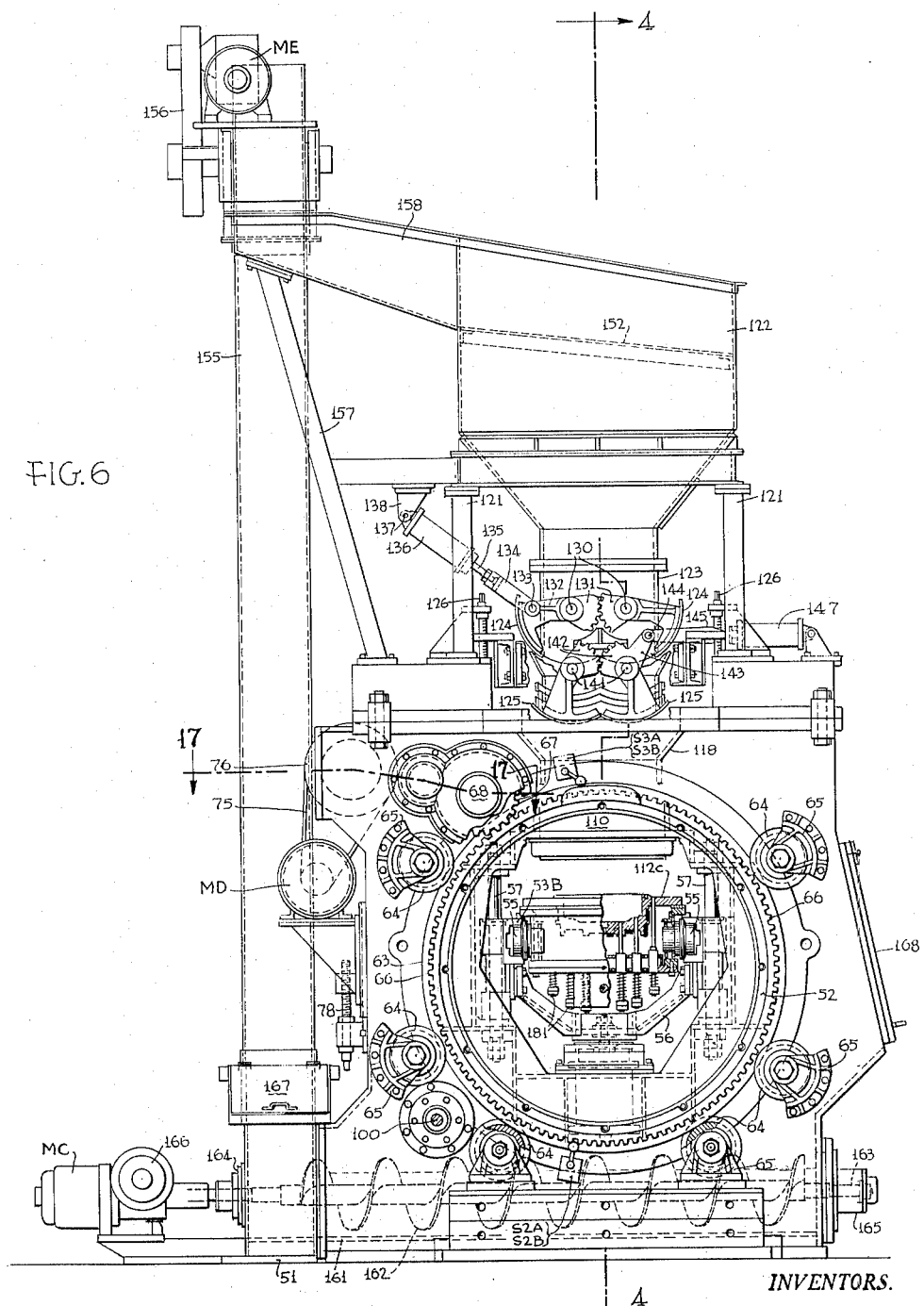

INVENTORS.
Kenneth E. Davis
William A. Weightman
BY
Maurice A. Crews
ATTORNEY

Nov. 22, 1955 K. E. DAVIS ET AL 2,724,158
APPARATUS FOR MAKING MOLD SHELLS
Filed Nov. 22, 1952 20 Sheets-Sheet 6
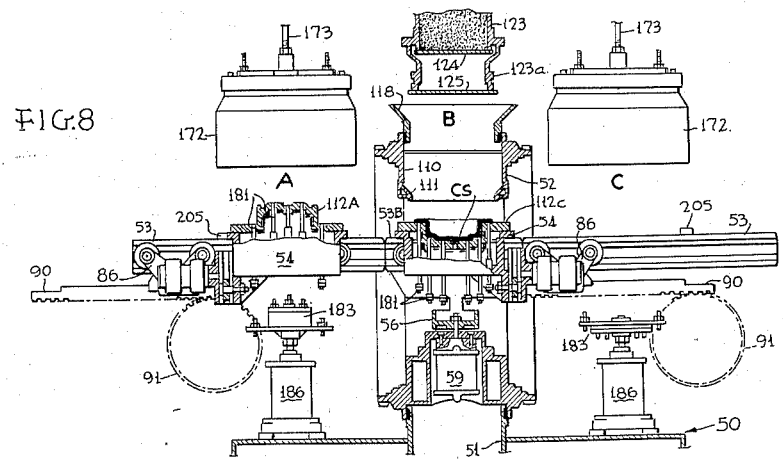
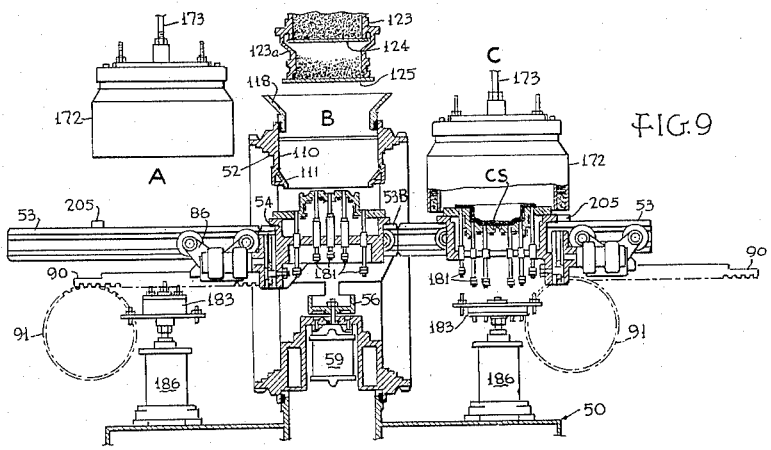
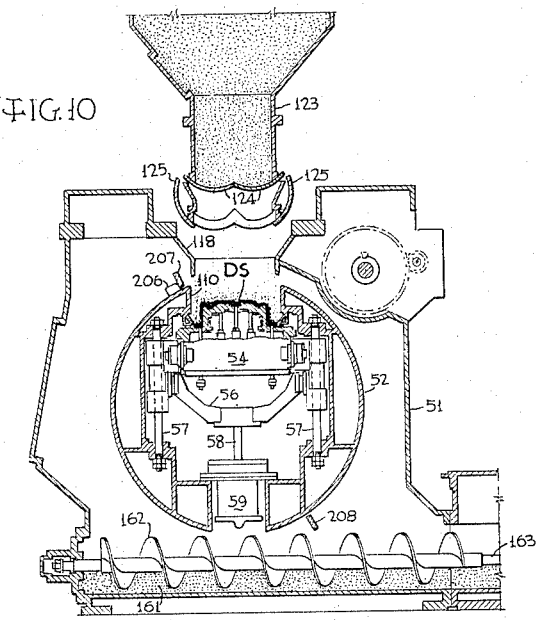
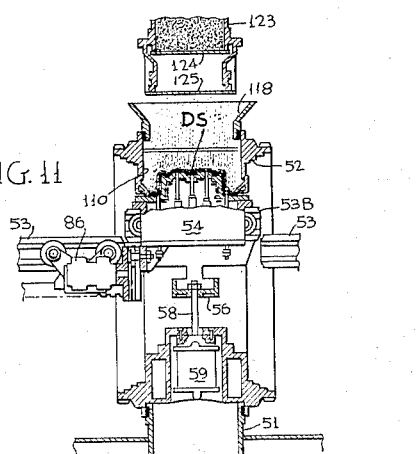
INVENTORS.
Kenneth E. Davis
William A. Weightman
BY Maurice A. Crews
ATTORNEY

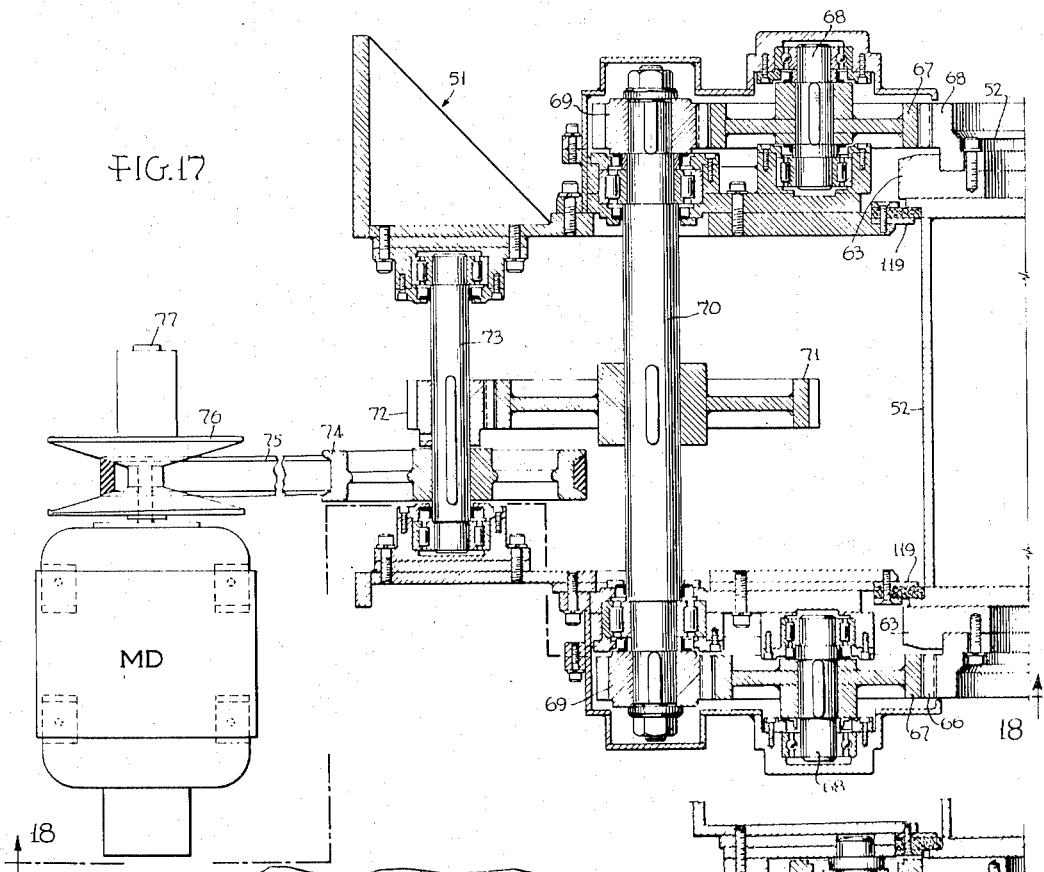
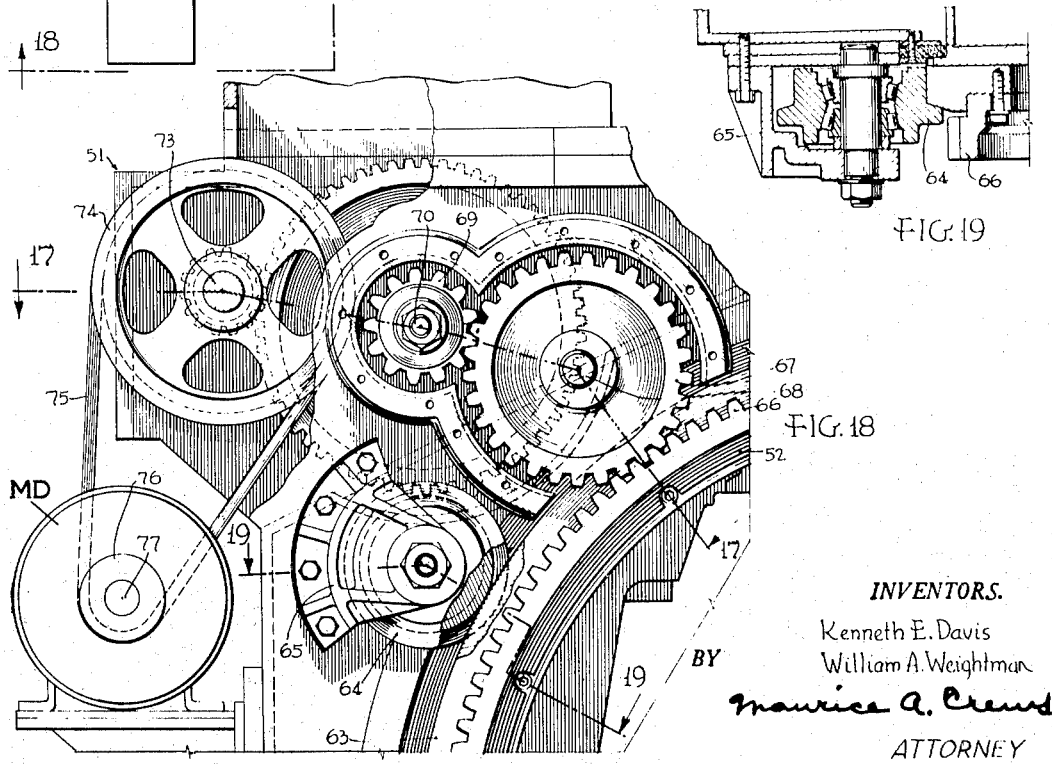

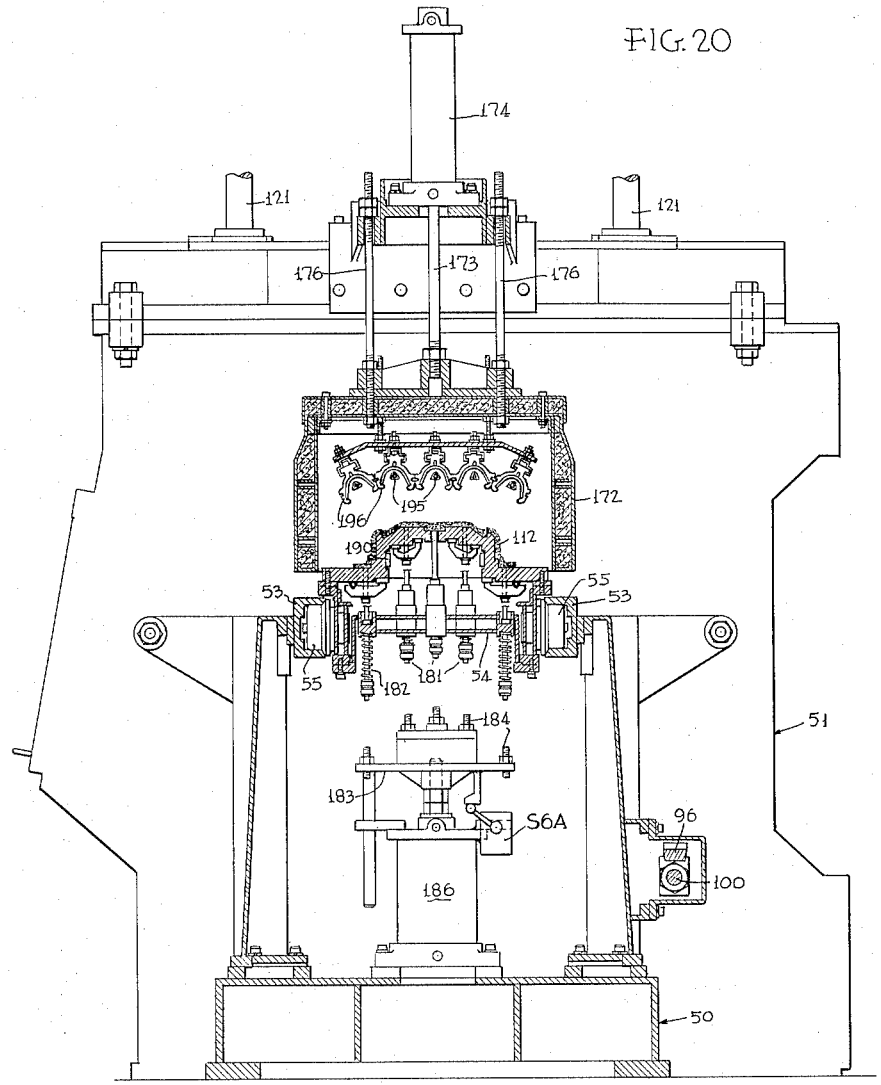

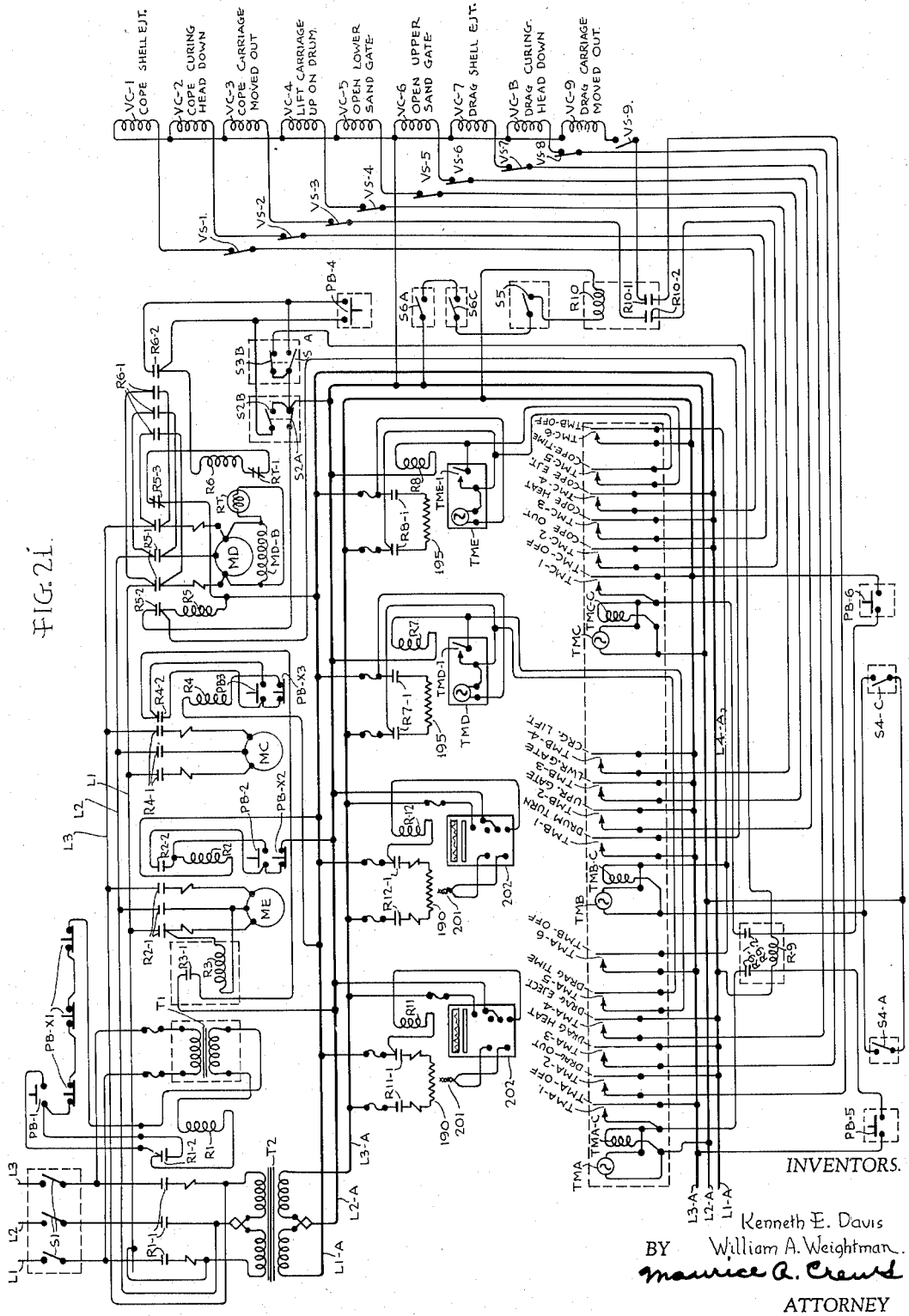

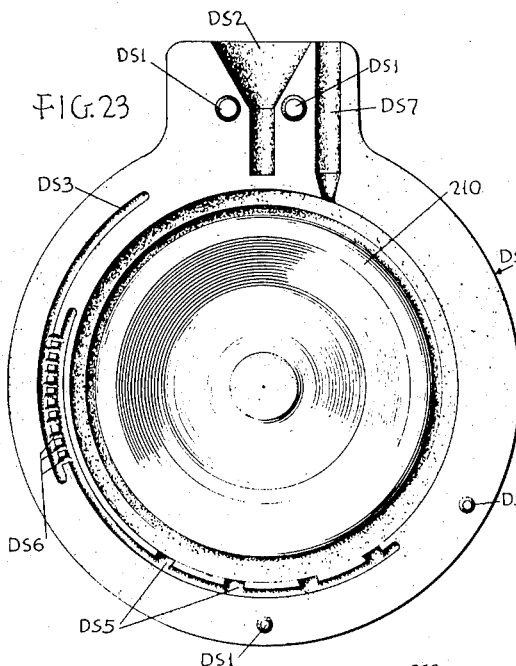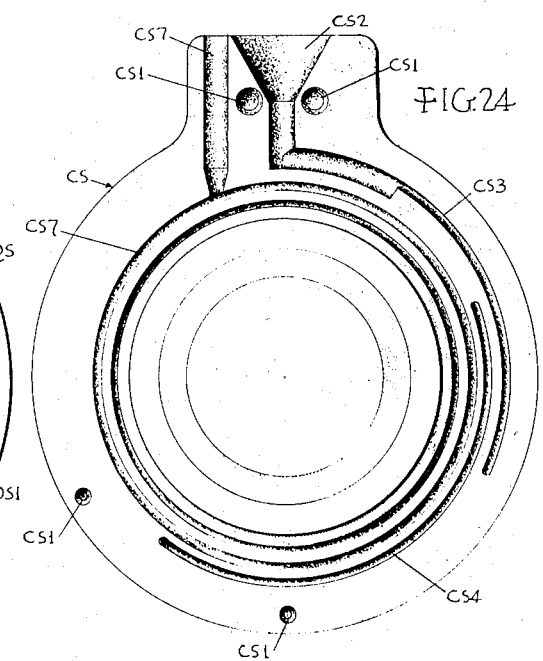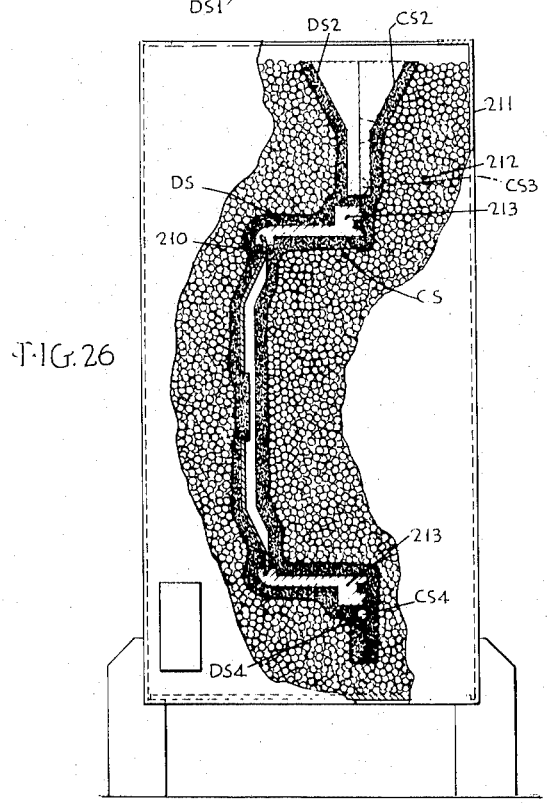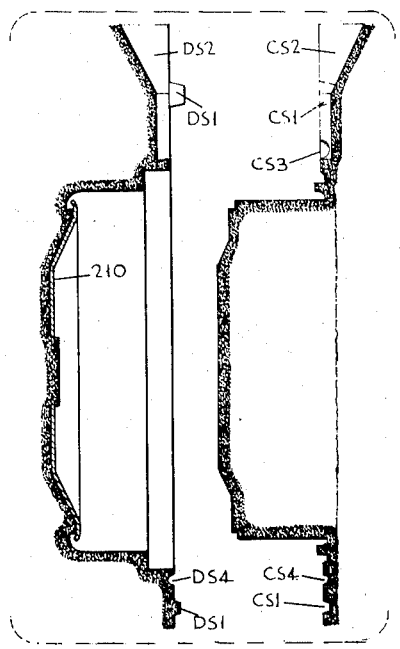
Nov. 22, 1955 — K. E. DAVIS ET AL — 2,724,158
APPARATUS FOR MAKING MOLD SHELLS
Filed Nov. 22, 1952 — 20 Sheets-Sheet 13
INVENTORS.
Kenneth E. Davis
William A. Weightman
BY Maurice Q. Creed
ATTORNEY

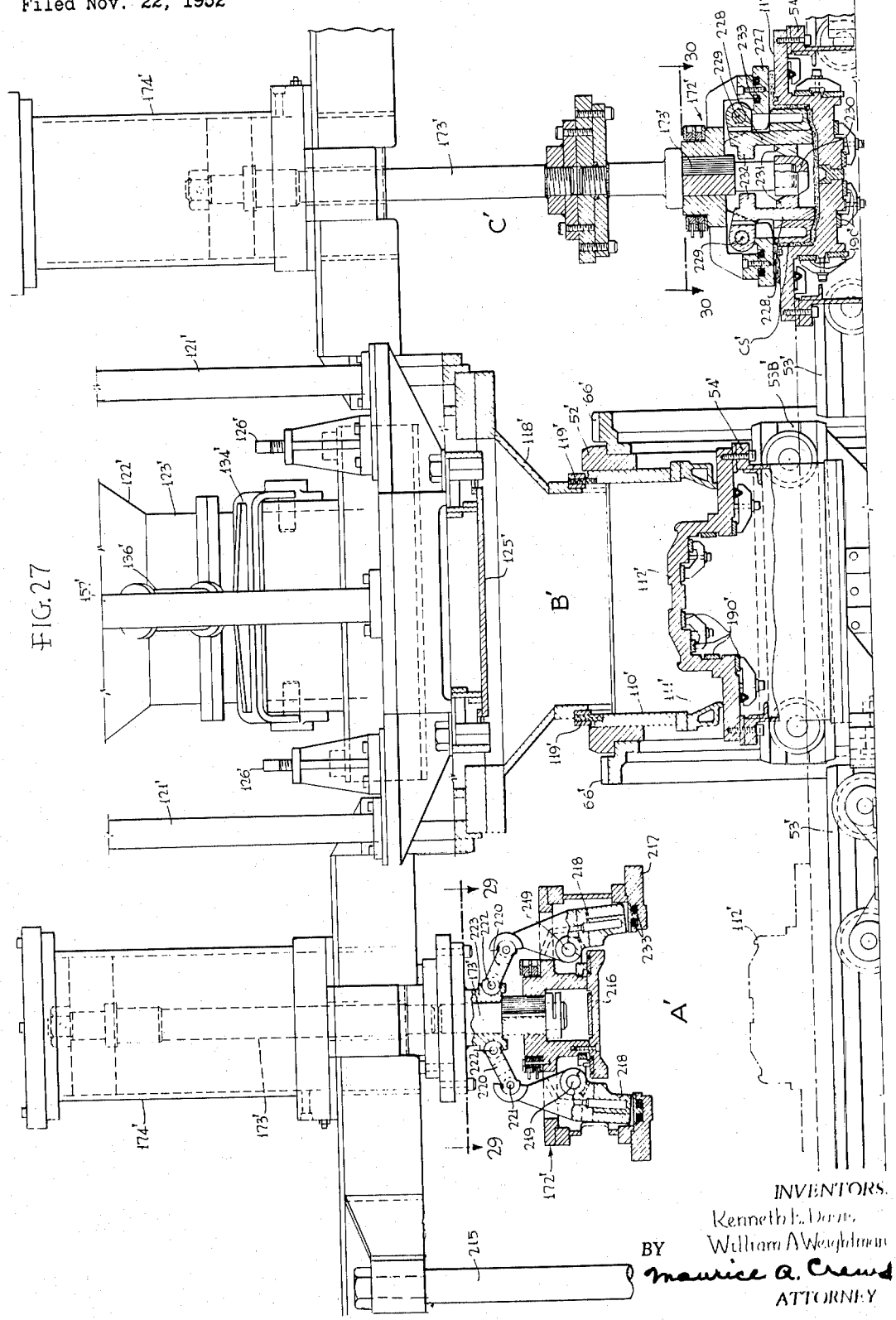

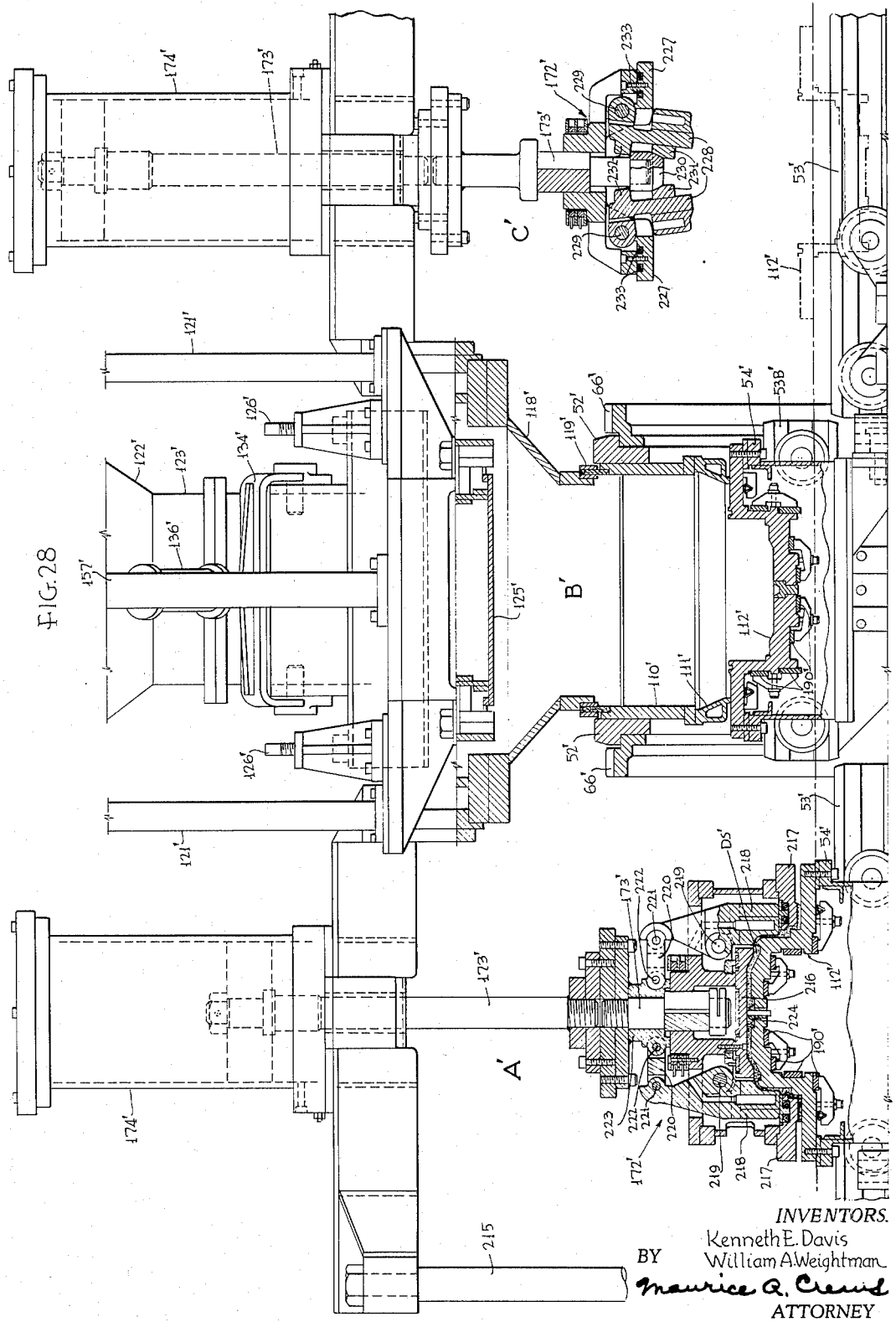

Nov. 22, 1955  K. E. DAVIS ET AL  2,724,158
APPARATUS FOR MAKING MOLD SHELLS
Filed Nov. 22, 1952  20 Sheets-Sheet 16

INVENTORS.
Kenneth E. Davis
William A. Weightman
BY Maurice Q. Crews
ATTORNEY

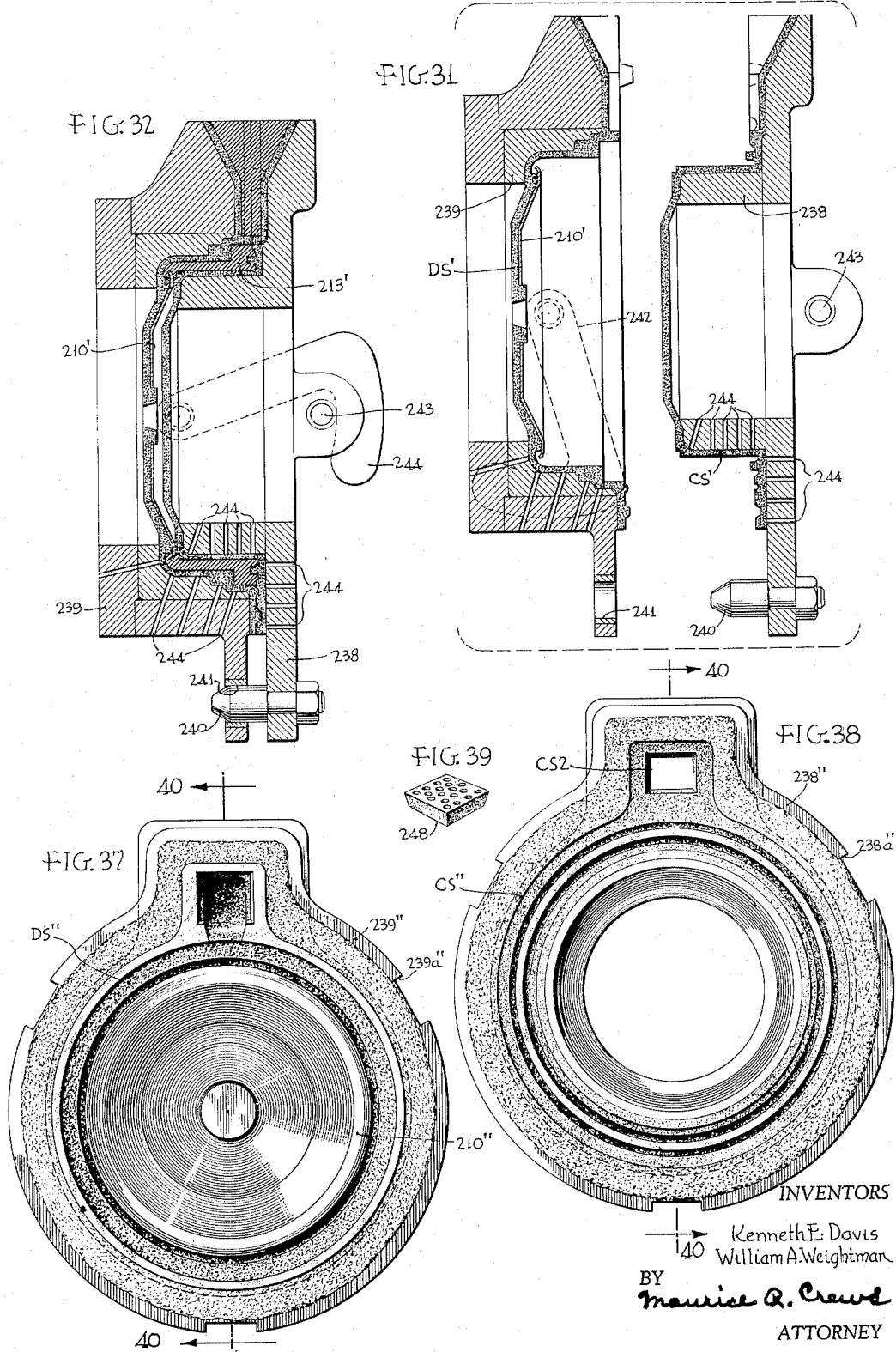

INVENTORS.
Kenneth E. Davis
William A. Weightman
BY Maurice A. Crews
ATTORNEY

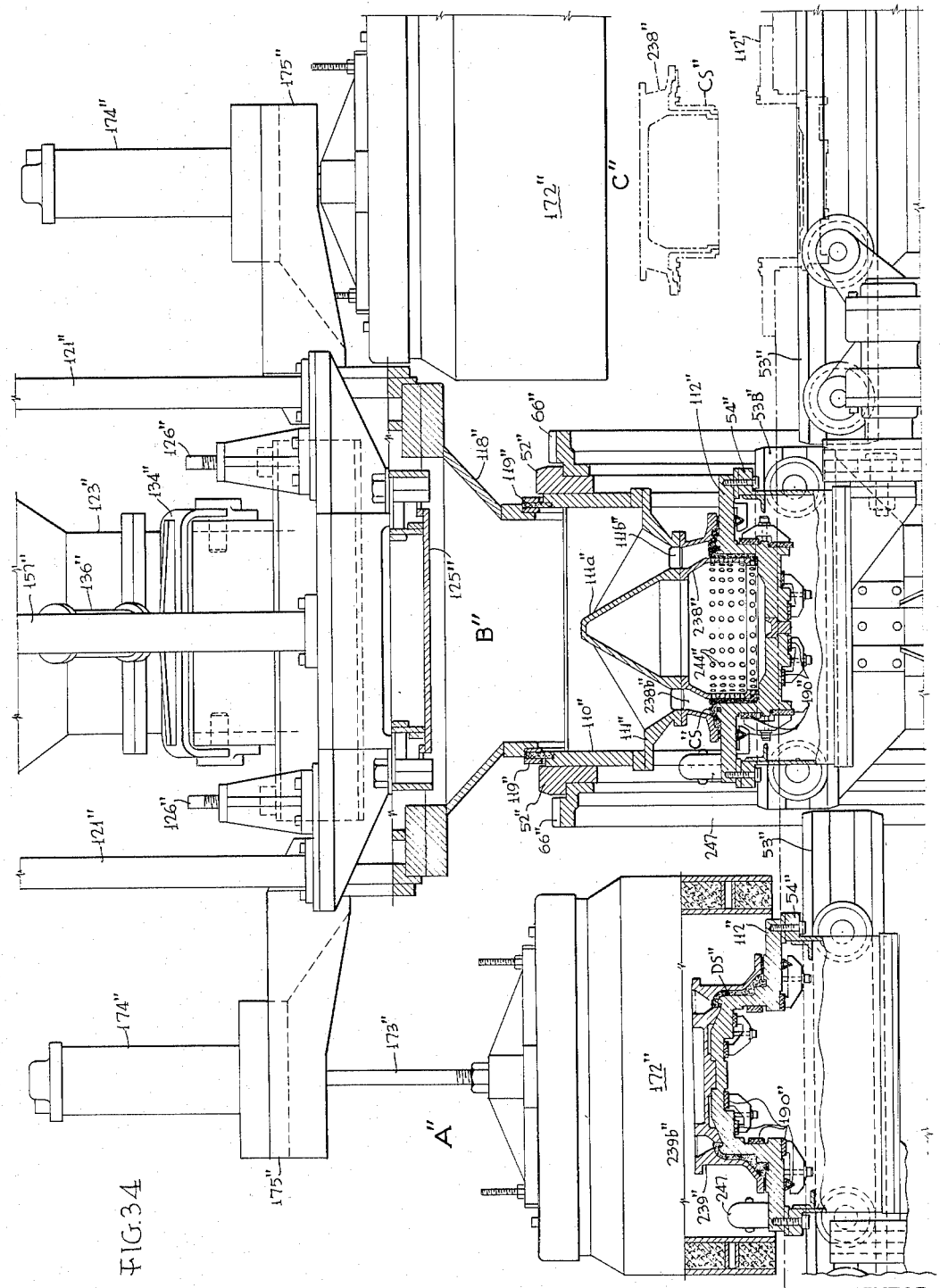

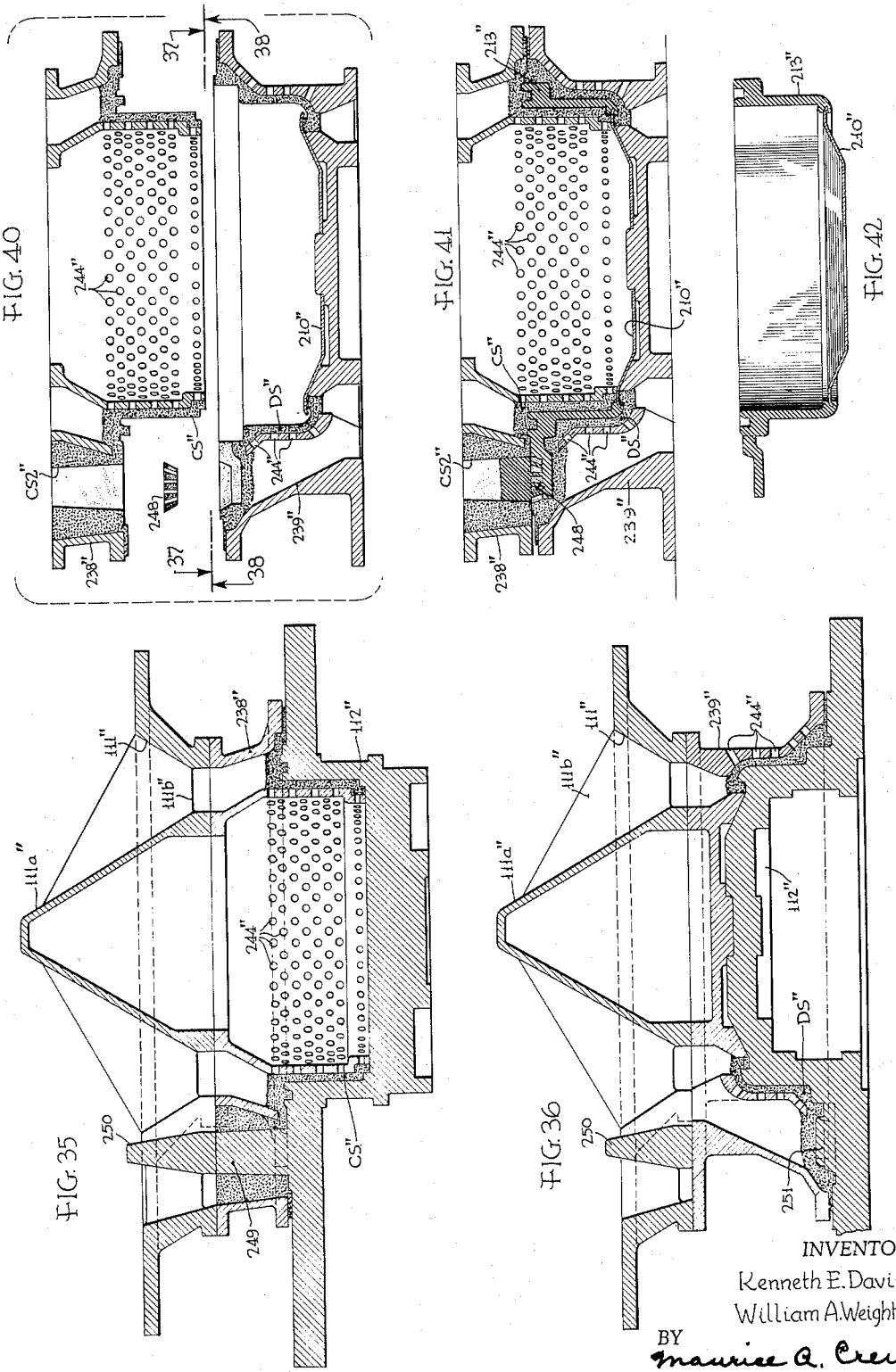

United States Patent Office 2,724,158
Patented Nov. 22, 1955

2,724,158

APPARATUS FOR MAKING MOLD SHELLS

Kenneth E. Davis, Elkins Park, and William A. Weightman, Philadelphia, Pa., assignors to The Budd Company, Philadelphia, Pa., a corporation of Pennsylvania Application November 22, 1952, Serial No. 322,014

12 Claims. (Cl. 22—20)

This invention relates to molding and casting apparatus and method, particularly to apparatus and method for making casting mold shells, and has for an object the provision of improvements in this art.

A recent trend in the casting art has been the use of a casting shell made of sand and a plastic material, the shell being formed and partially hardened by heat on a pattern, after which it is separated and assembled with a mating pattern and backed by granular material, such as shot, to form a mold into which metal is poured to make a casting.

Heretofore such shells have been formed by pouring the sand mixture upon a heated metal pattern to fuse a coating of the mixture on the pattern, after which the pattern was inverted to pour off excess unfused sand mixture. The shell, which remained on the pattern, was then cured to the extent desired, pulled from the pattern, and stored until needed for casting operations. After casting, the shells were destroyed.

It is one of the particular objects of the present invention to provide improved apparatus for making such shells automatically.

Another object is to provide a shell molding machine which makes mating cope and drag shell mold elements in alternation, using in part certain common means.

Another object is to provide improved shell molding patterns and improved means for handling them.

Another object is to provide improved means for supplying a sand mixture to patterns and for removing excess sand mixture from the patterns.

Another object is to provide improved means for heating patterns and shells.

Another object is to provide improved means for removing a shell from a pattern.

Another object is to provide improved means and method for forming the back of a mold shell.

Another object is to provide improved means and method for backing a mold shell for casting.

The above and other objects and advantages of the invention will be apparent from the following description of an exemplary embodiment, reference being made to the accompanying drawings thereof, wherein:

Fig. 3 is a side elevation, with parts in section looking at the same side as in Fig. 1, but with the bucket elevator omitted;

Fig. 4 is a central longitudinal vertical section taken on the line 4—4 of Fig. 6;

Fig. 5 is an enlarged partial vertical section showing some of the parts seen in the lower portion of Fig. 4, the view being taken with the pattern carriage removed;

Fig. 6 is an enlarged transverse vertical section and elevation taken on the line 6—6 of Fig. 3;

Fig. 8 is a vertical section similar to Fig. 4, but on a smaller scale, certain parts being in different positions;

Fig. 9 is a view like Fig. 8 but showing the parts at another stage of operation;

Fig. 10 is a transverse vertical section similar to Fig. 7, but on a smaller scale, and showing the parts in a different stage of operation;

Fig. 11 is a partial view like Fig. 9 but showing the parts at another stage of operation, namely that shown in Fig. 10 but with the supply gates closed;

Fig. 17 is an enlarged horizontal section or plan taken on the line 17—17 of Figs. 6 and 18;

Fig. 18 is a vertical longitudinal section taken on the line 18—18 of Fig. 17;

Fig. 19 is a section taken on the line 19—19 of Fig. 18;

Fig. 20 is an enlarged transverse vertical section taken on the line 20—20 of Fig. 3;

Fig. 21 is a wiring diagram;

Fig. 23 is an inside elevation of a completed drag mold shell with a drum disk insert arranged therein in preparation for casting;

Fig. 24 is an inside elevation of a cope mold shell;

Fig. 25 is section through the drag and cope shells of Figs. 23 and 24 as they are brought into assembled relationship for casting;

Fig. 26 is a vertical section through the shell assembly in a casting box after a brake drum has been cast therein;

Fig. 27 is a vertical longitudinal section similar to Fig. 9 but showing a second embodiment of shell forming apparatus;

Fig. 28 is a view similar to Fig. 27 but showing the parts in different positions;

Fig. 31 is a section through mating shells and metal backing members while being brought together in assembly for casting;

Fig. 32 is a similar section but with the parts brought together and after casting;

Fig. 34 is a view similar to Fig. 33 but showing the parts in different positions;

Fig. 35 is an enlarged section of some of the parts shown in Fig. 34 but on a different section line;

Fig. 36 is an enlarged section of some of the parts shown in Fig. 33 but on a different section line;

Fig. 37 is an inside face view of a drag shell and backer assembly formed according to the third embodiment and with a drum disk inserted therein ready for casting;

Fig. 38 is a similar view of the mating cope assembly;

Fig. 39 is a perspective view of a strainer which is assembled with the shells of Figs. 37 and 38;

Fig. 40 is an axial section showing the parts of Figs.

Figure 1:
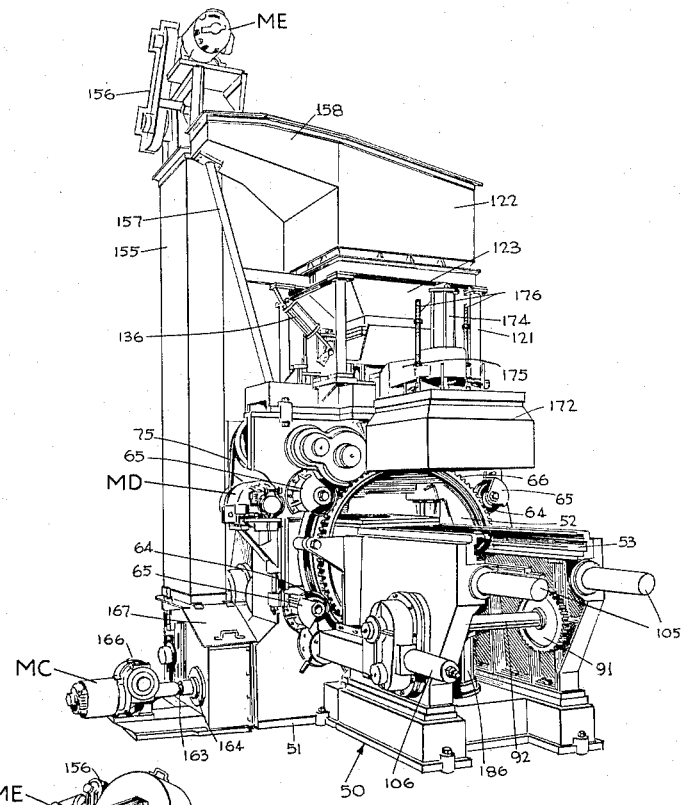
Fig. 1 is a perspective elevational view showing one side of the apparatus.

37, 38 and 39 being brought together in preparation for casting;

Fig. 41 shows the final assembly after casting; and

Fig. 42 shows the brake drum assembly of Fig. 41 removed from the mold.

General features of invention

The apparatus provided by the present invention, in general, comprises a three-station machine. At a central station a ring drum turnable about a horizontal longitudinal axis alternately receives one of two shuttle carriage patterns (cope and drag); causes it to receive a charge of sand mixture from a hopper and to fuse a layer of sand mixture on the pattern to form the shell; rotates to carry the carriage and pattern into upside down position to dump out excess sand mixture; and brings the carriage and pattern upright again into position to be pushed out to one of the two end stations. At the two end stations the shells on the patterns are cured on the back and then ejected from the patterns. At each end station power means are provided for bringing a heating head down over the shell and other power means are provided for ejecting the shell from the pattern after it has been cured and the heating head retracted.

The invention provides different methods of curing the backs of the shells, depending on the mode of backing the shells when they form molds for casting.

According to the first method, the shells are simply baked on the back and left rough. Such shells are suitable for backing by particles, such as shot, in known manner. If strong enough and the castings light enough, the shells may be used without backing. This also is known.

According to the second method, the shells are shaped on the back as they are baked, as by a back pattern which has a predetermined shape. These shells are suitable for backing by mold or flask backing elements which fit the predetermined shape imparted to the backs of the shells by the back-shaping patterns.

According to the third method, the shells are shaped on the back as they are baked, as by a back pattern member, which remains with the shell during the casting stage to form a mold or flask backing therefor. After casting, the backing pattern has the sand mixture shell removed therefrom, as by shaking, and is re-used for making a new shell.

With this survey of the general features of the invention, reference may now be made to the specific embodiment shown in the accompanying drawings.

The shell forming apparatus

A base frame 50 forms the main support for the mechanisms provided hereby. There is a central filling station B and two end curing stations A and C. Here, station A is used for curing a drag shell and station C is used for curing a cope shell.

The central part 51 of the base 50 forms an enclosure and support for a ring drum 52 and the end portions carry fixed track sections 53, 53 for pattern carriages 54, 54. The track rails are channel-shaped and closely fit carriage wheels 55. As shown in Figs. 3, 4, 5, 6, and 7, the channel rails of a central track section 53B are carried by a lift 56 mounted for reciprocating movement upon guide rods 57 carried by the ring drum 52. The lift is mounted upon and operated by a piston rod 58 carried by a piston (not shown) operating in a fluid (air) cylinder 59 secured within the drum ring 52.

As shown in Fig. 6, the ring drum 52 is provided with circumferential end trunnion bands 63 mounted for turning movement upon trunnion rollers 64 turnable on shafts carried by brackets 65 secured to the central portion 51 of the base frame. At each end, Fig. 4, the ring drum 52 is provided with circular rack gears 66 which, as shown in Fig. 6, are engaged by pinion gears 67 on shafts 68.

As shown in Figs. 17 and 18, the gears 67 are engaged by pinion gears 69 carried by a common drive shaft 70. On the shaft 70 there is keyed an intermediate gear 71 driven by a pinion 72 on a shaft 73. The shaft 73 carries a pulley 74 driven by a V-belt 75 from an axially adjustable split pulley 76 carried by the shaft 77 of a drum drive motor MD. The motor position is adjustable coordinately with the axial opening and closing of the split pulley 76, as by a slide having an adjusting screw 78 (Figs. 3 and 6), to form an adjustable speed drive for the drum 52.

Figure 12:
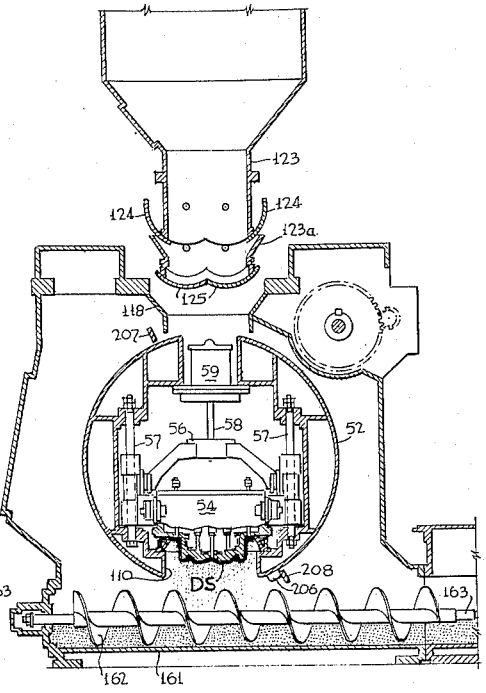
Fig. 12 is a view like Figs. 7 and 10, but showing the parts at another stage of operation.

The drum does not make a full revolution but moves back and forth about half a revolution (180°) between what will be referred to as an upright or filling position, as shown in Fig. 10, and an inverted or dumping position, as shown in Fig. 12.

The two carriages 54 move together along the track, but since the drum is between them, they cannot readily be directly coupled together. Furthermore, since each carriage must reciprocate longitudinally on the track and must move transversely of the track axis and rotate with the central section of the track when it is positioned on the ring drum, provision must be made to accommodate the movements on the drum while at all times holding the carriage securely longitudinally relative to the main axis of the track. For this the following means are provided.

As shown in Fig. 4, each carriage 54 at the center is provided with an outwardly projecting pivot stem bolt 80 which carries a slide 81 movable in a guide 82 provided on a coupling head 83 carried by a stub shaft 84. The stub shaft 84 is axially fixed, but turnable in a bearing box 85 carried by a supplemental carriage or carriage crosshead 86 having wheels 55 like those of the pattern carriages which ride in the channel-shaped rails of the fixed track sections 53.

Figure 16:
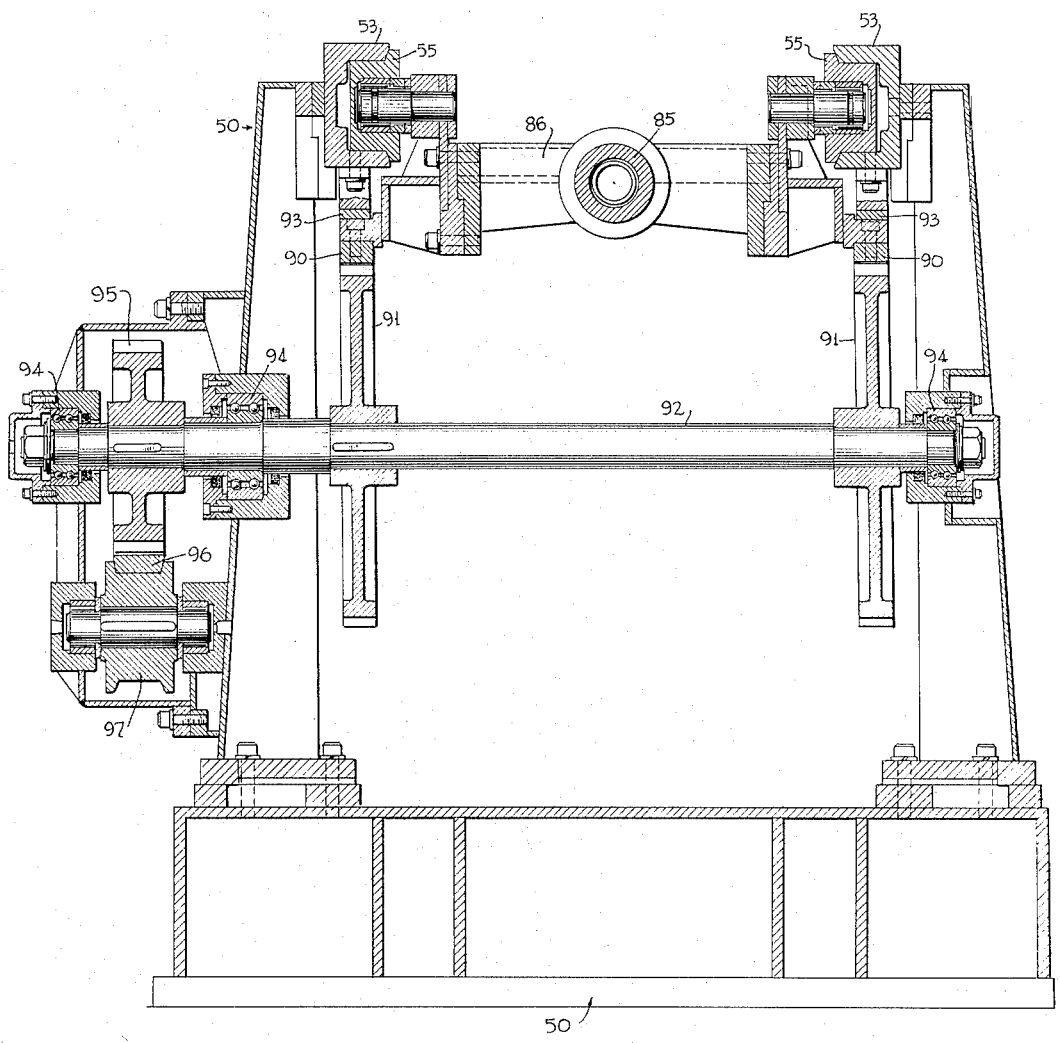
Fig. 16 is an enlarged transverse vertical section taken on the line 16—16 of Fig. 3.

Rack bars 90 are secured to each carriage crosshead 86, adjustment being provided to cause the carriage to stop accurately in the required position on the ring drum track 53B. As shown in Fig. 16, there is a rack bar 90 on each side of the carriage crosshead, the rack gear of each bar meshing with a gear wheel 91 carried fast on a cross-shaft 92. Backing guides 93 are provided for each rack bar 90 above the gear wheel 91.

The shaft 92 is turnably mounted in fixed bearings 94 carried by the main base frame 50 and at one end carries fast thereon a gear 95 which is driven by a reciprocating rack bar 96. The rack bar 96 is supported in mesh with the gear 95 by a roll 97 turnably carried by the main frame 50.

As shown in Fig. 3, both of the rack bars 96 are arranged in alignment and connected together through the piston rod 100 of a piston 101 operable in a fluid (air) cylinder 102 fixed in the main frame.

From this it will be clear that when the piston rod 100 moves, it moves both of the rack bars 96 together and through the train of gears provided causes the carriage crossheads 86 to move together. The crosshead wheels always remain on a fixed track section, but the pattern carriage wheels move from a fixed track section to the movable track section carried by the lift on the ring drum 52. The coupling head 83 and related parts forming the connection between a carriage and its crosshead hold the carriage in proper position along the track axis, while permitting a carriage when positioned on the drum lift to have transverse and rotary movement, as required.

Enclosed pocket casings 105 are provided on the ends of the main frame to receive the rack bars 90 when they are in their outward positions and enclosed pocket casings 106 are provided for the ends of drive rack bars 96, adjustable stop screws 107 being secured in the ends of the pocket casings 106 to limit the movement of the rack bars 96.

Figure 7:
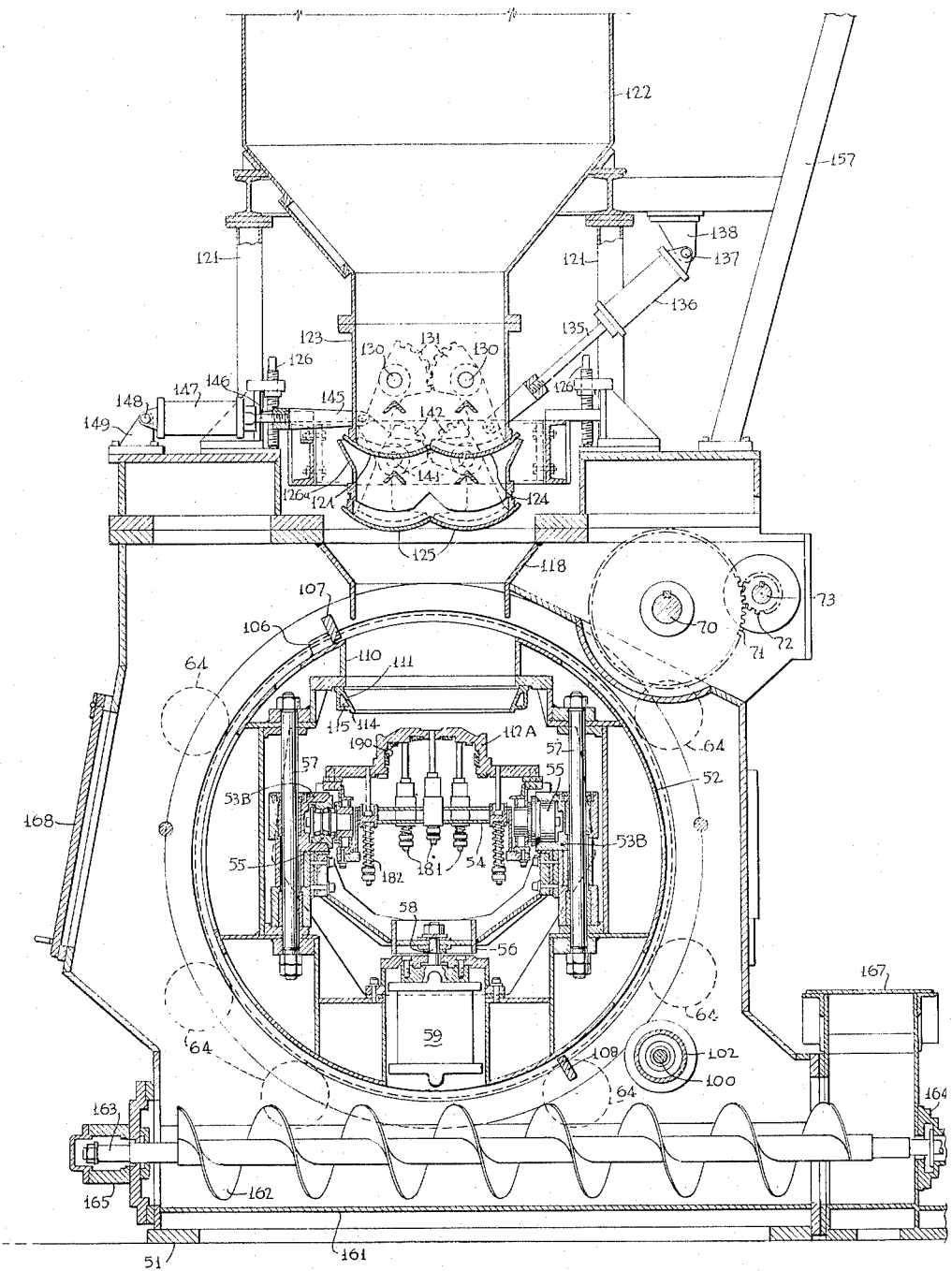
Fig. 7 is an enlarged transverse vertical section taken on the line 7—7 of Figs. 3 and 4.

Means are provided for supplying sand mixture to the patterns when they are presented for this purpose in the upright position of the ring drum. As shown in Figs. 4 and 7, the ring drum above the lift 56 is provided with a pocket 110 having a funnel ring 111 at its inner end. The pattern 112 (drag 112A or cope 112C) carried by a carriage 54 is provided with an annular surface adapted to seat and seal against an annular depending rib 114 of the funnel ring when the carriage with the pattern is pushed up by the lift. It should be noted here that the patterns are heated by means which will be later described and that the funnel ring 111 is provided with a chamber 115 for cooling fluid to keep this zone cool and thereby avoid fusing sand mixture here.

The mid-portion 51 of the main frame (Figs. 4 and 7) is provided with a funnel ring 118 which on the sides (Fig. 4) has an arcuate seal 119 with the side edges of the ring drum. In fact, this arcuate seal extends around the full circumference of the ring drum. Transversely, as seen in Fig. 4, there is a close fit between the fixed funnel ring 118 and the circumference of the ring drum. This arrangement keeps the sand mixture confined to the places where it is wanted without troublesome spilling to places where it might be objectionable.

Supported on the central portion 51 of the main frame by struts 121, in a position above the fixed funnel ring 118, there is provided a hopper 122 for sand mixture and beneath the hopper there is a chute 123. The chute 123 is provided with upper gates 124 and lower gates 125. The lower gates 125 are carried by a chute extension 123ª which is adjustable vertically relative to the main part of the chute, as by bolts 126 and related parts, to vary the amount of sand mixture fed down by the upper gates upon the lower gates. The upper gates open and close while the lower gates are closed to feed down a given charge of sand mixture; and the lower gates later open to feed the sand mixture down upon a pattern, and then close.

As shown in Fig. 6, the upper gates 124 are mounted on shafts 130 and are connected to move conjointly but oppositely by segmental gears 131. One of the shafts 130 at each side of the chute is provided with an arm 132 and to these arms there is connected, as by pivot pins 133, a yoke 134 which is carried by the rod 135 of a piston (not shown) operating in a fluid power cylinder 136 which is pivoted, as by a pivot pin 137, to a fixed bracket 138.

Similarly, the lower gates 125 are mounted on shafts 141 and are connected to move conjointly but oppositely by segmental gears 142. One of the shafts at each side of the chute is provided with an arm 143 and to these arms there is connected, as by pivot pins 144, a yoke 145 which is carried by the rod 146 of a piston (not shown), operating in a fluid power cylinder 147 which is pivoted, as by a pivot pin 148, to a fixed bracket 149.

As shown in Fig. 4, the hopper 122 is provided with a screen 152, which may be of the vibratory type, to remove lumps from the sand mixture supplied to the hopper. The screen is inclined, as indicated in Fig. 6, to collect lumps at the lower end, where they may be removed by way of a clean-out door 153, Fig. 2.

Means are provided for supplying sand mixture to the hopper 122, the means herein shown comprising a chain bucket elevator, generally indicated by the numeral 155, and driven by a power unit, generally indicated by the numeral 156 and including a drive motor ME. The drive unit is shown as being mounted on top of the conveyor housing. A prop strut 157 braces the elevator housing on the main frame and partly supports a delivery chute 158 connecting the hopper with the elevator casing.

Means are provided for conveying to the elevator the excess sand mixture which is dumped from the patterns when the ring drum is turned upside down. As shown in Figs. 4, 6 and 7, a transverse sump trough 161 is provided beneath the ring drum and within this trough there operates a screw conveyor 162 having a shaft 163 turnably mounted in end bearings 164 and 165. As shown in Fig. 1, the screw conveyor shaft 163 is driven by a motor MC and gearing housed in a gear box 166.

Figure 2:
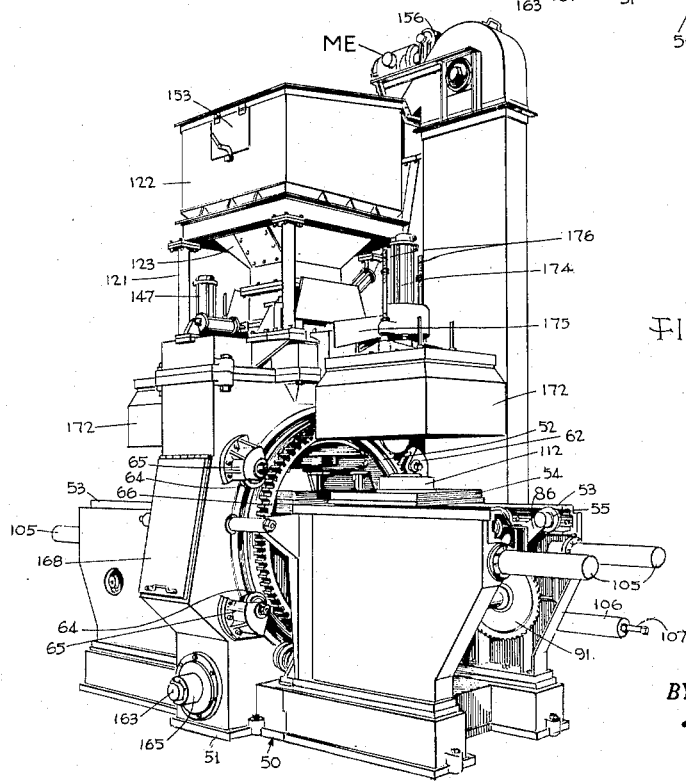
Fig. 2 is a similar perspective elevational view showing the other side.

A door 167, Fig. 1, is provided in the housing of elevator 155 and another door 168, Fig. 2, is provided on the other side of the central frame portion 51 for charging sand mixture to the conveyor devices to be elevated into the hopper 122.

Means are provided at each of the end stations, A or C, for curing the backs of the shells or for both curing and shaping the backs. For this purpose, as shown in Figs. 1 to 4, there is provided at each end station a heating or curing head 172 carried by a piston rod 173 of a piston (not shown) which operates in a cylinder 174 mounted on a bracket 175 carried on the side of the central portion 51 of the main frame. Adjustable guide and stop rods 176 (Figs. 1, 2 and 20) on the head operate in guides 177 therefor on the bracket for keeping the head properly oriented and to stop it in proper bottom position.

Means are provided for removing the completed shells from the patterns after the final curing has been completed. The means herein provided, Fig. 4, comprises a plurality of knock-out pins 181 carried by each pattern 112 (drag 112A or cope 112C), these pins being held normally in lower retracted position, as by springs 182, and held from dropping out by any suitable stops (not shown). At each end station, A or C, there is provided a knock-out plunger head 183 carrying adjustable pusher studs 184 adapted to severally engage the knock-out pins 181 of the pattern to push them up and remove the shell. Each head 183 is adjustably mounted on the piston rod 185 of a piston (not shown) operating within a fluid cylinder 186 secured to the base of the main frame 50. The shells are shown in some of the views. In Figs. 3, 4, 10, 11, 12, 13, 14 and 15 a drag shell DS is shown and in Figs. 8 and 9 a cope shell CS is shown.

The means provided for heating the patterns 112, as shown in Fig. 20, comprise electrical resistors 190 mounted within the cope or drag pattern and secured by any suitable means. The units selected are adapted to be energized at frequent intervals to maintain the metal portions of the pattern at approximately uniform temperature. Commercial elements shown as "chromalox" units, which do not short when their exterior shell is in engagement with metal, may be used. Suitable flexible cable connections to the pattern heaters which permit the necessary longitudinal, transverse, and turning movements, are provided. These are omitted for clarity of illustration of the machine parts.

The means provided for heating the curing heads, as shown in Fig. 20, comprise electrical resistors 195 secured in position by contact holders 196. The units selected are adapted to furnish high temperature heat quickly after energization. Commercial elements known as "Globars" may be used. Suitable flexible cable connections (not shown) to the curing head heaters, which permit the necessary vertical movements of the head, are provided.

Means are provided for supplying cooling fluid to the fluid passage 115 of the funnel ring 111 on the ring drum, these means having sufficient length and flexibility to permit the drum to turn over and back as required. Flexible means are also provided for supplying motive fluid, such as air, to the power cylinder 59 for the lift 56 mounted on the ring drum. Again, these flexible connections are omitted for clarity of illustration of other parts.

The fluid motor, represented by the cylinder designation 59 for the lift on the ring drum, the fluid motors, represented by the cylinder designations 136, 147, for the upper and lower sand mixture gates 124 and 125 respectively, the fluid motors, represented by the cylinder designation 174 for the curing heads 172, and the fluid motors represented by the cylinder designation 186, for the knock-out or ejector heads 183, are all positively and controllably actuated by valve and solenoid means to move in one direction and are automatically moved back to a rest position when the solenoid is de-energized, as by springs, constant fluid pressure, or controlled reverse fluid pressure. Such means are well known; the solenoid control means for the controlled or active stroke are shown in the wiring diagram, Fig. 21. The fluid motor, represented by the cylinder designation 102, for the reciprocatory carriage travel is arranged to be controlled in both directions of movement by solenoid valve means. This, again, is illustrated as to solenoid operation in the wiring diagram, Fig. 21.

*Controls*

The wiring diagram, Fig. 21, shows the major elements and controls of the apparatus. Electric current is supplied from a suitable three phase alternating current source by conductors L1, L2, L3 through a main switch or circuit breaker S1. A relay R1, which is energized when a start push-button PB-1 is actuated, closes a line switch R1-1 to supply power to all the apparatus. Relay R1 locks in on its own switch R1-2. Several stop push-buttons PB-X1 in series with the lock switch R1-2 are located at suitable points for ready access to stop operations when desired. Power is supplied to the relay by a transformer T1 from the lines L1, L3. A three-phase transformer T2 supplies power to control lines L1A, L2A, L3A.

The bucket chain conveyor elevator motor ME is set into action by a start push-button PB-2 which energizes a relay R2, which closes a switch R2-1 to the motor. The relay locks in on its own switch R2-2. A stop push-button PB-X2 is in series with the lock switch R2-2.

It is arranged that the screw conveyor cannot operate unless the bucket elevator is operating to take away sand mixture which the screw conveyor would bring to it. To provide for this, a relay R3 is wired to be energized in parallel with the elevator motor ME when the power switch R2-1 of that motor is closed. Energization of relay R3 closes a switch R3-1 in a line to a relay R4 for the screw conveyor motor MC. A start push button PB-3 is provided in the energizing circuit from R3-1 to relay R4 and when relay R4 is energized it closes a power switch R4-1 to the screw conveyor motor MC. The relay R4 locks in on its own switch R4-2. A stop push button PB-X3 is in circuit with the lock switch R4-2 to stop the motor MC when desired.

The ring drum turning motor MD is reversible and is started into operation in a forward direction, that is from an upright position of a pattern toward an upside down dumping position, by a relay R5 which when energized closes a forward direction switch R5-1 to the motor MD. Relay R5 locks in on its own switch R5-2. When energized, relay R5 also opens a normally closed switch R5-3 to avoid operation of reversing controls. The energizing circuit of relay R5 is controlled by a timing device which will be described presently.

The lock switch R5-2 of relay R5 is in series with a limit switch S2A which is opened when the drum nears its upside down position. The rotation is slowed by a motor brake represented by a brake release coil MD-B and is halted in proper position by a positive stop which will be described later. Switch S2A is ganged or paired with a switch S2B which closes when S2A is opened and vice versa.

Ganged limit switches S3A and S3B are provided at the top or home position of the drum, switch S3A being opened and S3B closed when the drum nears its top or home position. The reverse rotation of the drum is slowed by the motor brake, as before, and another positive stop halts it in exact final position.

The opening of switch S2A in the upside down position of the drum de-energizes R5 and opens the forward motor switch R5-1, besides de-energizing the coil MD-B to apply the brake as noted. It also allows switch R5-3 to re-close.

Closure of switches R5-3 and S2B completes a circuit to a reversing relay R6, except that a time delay relay RT which was de-energized when the brake coil MD-B was de-energized, holds open for a time its switch RT-1 which is in the circuit of relay R6. When RT-1 closes after the time delay, it energizes relay R6 which closes the reverse motor switch R6-1 to cause the drum to be turned back to upright position. Relay R6 locks in on its own switch R6-2. Switch R6-2 is in series with limit switch S3A, which is opened when the drum nears its upright position and relay R6 is de-energized to cut the motor switch R6-1 and apply the brake. It is to be noted that the time delay device RT is of such a nature that it is not energized on reverse current to open its switch RT-1 and the proper action of R6 is not interfered with.

A re-set push-button PB-4 is provided in parallel with lock switch R6-2 for bringing the ring drum back to top position in case the operator may have actuated a stop push button when the ring drum was between end positions. It makes the circuit to relay R6 through limit switch S3A which, of course, is closed when the drum is away from its top position.

On the right of the wiring diagram there are shown a number of solenoid coils for operating fluid valves to control various fluid motors which have been described. It will be understood that when each coil is energized it will open its associated valve and cause a power stroke to take place. Such solenoid valves are so well known that their action can be fully understood from an explanation of coil functions without detailed illustration.

At the top there is shown a solenoid coil VC-1 for the valve of the power cylinder 186 for raising the cope shell ejecting head at the end station C.

Next below, there is a solenoid coil VC-2 for the valve of power cylinder 174 for lowering the cope curing box or head at end station C.

Next, there is a solenoid coil VC-3 for the valve at that end of carriage cylinder 102 which causes the cope carriage to move from the center position at station B on the ring drum to the end station C.

Next, there is a solenoid coil VC-4 for the valve of the cylinder 59 on the ring drum for raising the lift with a carriage and pattern.

Next, there is a solenoid coil VC-5, for the valve of the cylinder 147 for opening the lower sand gates.

Next, there is a solenoid coil VC-6 for the valve of the cylinder 136 for opening the upper sand gates.

Next, there is a solenoid coil VC-7 for the valve of the cylinder 186 for raising the drag shell ejecting head at the end station A.

Next, there is the solenoid coil VC-8 for the valve of the cylinder 174 for lowering the drag curing box head at end station A.

Next, there is the solenoid coil VC-9, for the valve of that end of carriage cylinder 102 which causes the drag carriage to move from the center position at station B on the ring drum to the end station A.

The coils VC-1 to VC-9 respectively have in their lines switches VS-1 to VS-9 whereby they may be separately cut out or in by hand if desired.

Automatic adjustable timers are provided for controlling the energization of all of the valve solenoid coils VC-1 to VC-9, just described, for controlling the start of the movement of the ring drum from its top position, and for controlling the heating of the curing heads 172 for drag and cope.

As shown at the bottom of the wiring diagram, Fig. 21, three timers TMA, TMB and TMC are provided, each driven by a synchronous motor. The same designation will be used to refer to either the motor or to the timer unit as a whole. The timer TMA controls operations about the drag station A, hence will be referred to as the drag timer. For similar reasons the timer TMB will be referred to as the drum timer; and the timer TMC will be referred to as the cope timer. The timer units TMA and TMC operate in alternation, but the drum timer TMB operates every time that either of the other timers operates. Also timers TMA or TMC time themselves in and out; mutually cut out each other so that only one at a time can operate; and time the drum timer TMB in and out. It should also be noted that interlocking means are provided for preventing the start of operation of any of the timers unless the ring drum is in upright position; also for preventing longitudinal movement of the carriages along the track unless the lift is in its lowered position and the cope and drag ejector heads are in their lowered positions; and also for preventing the start of operation of the drum timer TMB unless one carriage is in an end position along the track and the other is accurately located on the drum.

The timers are a known commercial type in which the motor clutch coil when energized causes a switch controlling part to move a given distance within a given time and then to be de-energized. These clutch engaging coils are designated as TMA-C, TMB-C and TMC-C respectively for the three timers. Whenever a clutch coil is de-energized, the parts drop back to starting position and the timer action is stopped to await a new start regardless of how long the timer has been running. Adjustments on the timer provide that each switch thereof will be closed and opened at selected times. One such timer, known as the "Multiflex contact type," is sold by the Eagle Signal Corp.

The timer TMA has a first switch TMA-1 which is set to close immediately after the motor starts and forms a lock switch to keep the motor and its clutch coil energized until a given time has elapsed—which is also adjustable—and then times out the motor and clutch. The same function is served by the switch TMC-1 of the cope timer TMC, the same settings being used here because of the paired operations which they serve.

Switch TMA-2 of timer TMA, when closed, causes energization of solenoid coil VC-9 to produce the outward movement of the drag carriage from the drum at station B to the side station A. The cope carriage, being connected in train with the drag carriage through the rack and gear drive, is, of course, moved in from the back-curing station C to the drum at station B. Switch TMC-2 of timer TMC will cause the opposite effect, namely when closed, to energize coil VC-3 to move the cope carriage out from the drum at station B to station C, the same action moving the drag carriage from station A to station B.

Switch TMA-3, when closed, energizes solenoid coil VC-8 to move the drag curing head down. Similarly, the closure of switch TMC-3 energizes the solenoid coil VC-2 to move the cope curing head down.

Switch TMA-4, when closed, energizes solenoid coil VC-7 to move the drag ejector head up. Similarly, the closure of TMC-4 energizes the coil VC-1 to move the cope ejector head up.

Switch TMA-5, when closed, supplies current to a relay R7 having a switch R7-1 which, when closed, supplies current to the drag curing head heaters 195. An auxiliary timer TMD has a switch TMD-1 in parallel with the switch TMA-5 and at times, when the curing head is raised and not under the control of the curing timer TMA, the timer TMD will go on and off intermittently to keep the curing head space relatively hot. The switch TMA-5 assures that the head heaters will be on continuously throughout the entire time that high curing heat is needed.

Similarly, switch TMC-5 is in parallel with the switch TME-1 of an intermittent on-off timer TME to operate a relay R8 to actuate a switch R8-1 for the heating elements 195 of the cope curing head.

Timer switch TMA-6, when closed, causes the intermediate timer TMB to be operated, but only if the carriages are in one or the other of their terminal positions so that the pattern of one of the carriages is in proper position on the ring drum for the operations there to take place. To assure that the carriages are in one of their terminal positions, limit switches S4A and S4C are mounted at the ends of the tracks in position to be closed respectively when the drag or cope carriage is at the extreme outer end of its travel on the track.

Similarly, timer switch TMC-6, when closed, will start the intermediate timer TMB into operation provided that one of the carriage limit switches S4A or S4C is closed. It will be noted from the wiring diagram that the carriage limit switches S4A, S4C are in parallel with each other, as are the timer switches TMA-6 and TMC-6, but that one of each pair is in series, through a jumper line L4A, with the motor and with the clutch coil TMB-C of timer TMB. Consequently, the timer TMB will be started when either of the timers TMA or TMC is operated.

As above indicated, means are provided for causing operation of either of the timers TMA or TMC without the other and for preventing the start of operation of any of the timers unless the ring drum is in its top position. The means for effecting these results comprise a relay R9 which is energized through limit switch S3B which is closed when the ring drum is in its top position. When energized, relay R9 closes two switches R9-1 and R9-2 which are in series respectively with the timers TMA and TMC and with push-buttons PB-5 and PB-6 for starting these respective timers TMA or TMC. The push-buttons PB-5 and PB-6 are located at the ends of the main frame near the stations which they respectively serve.

The means for preventing movement of the carriages along the track except when certain parts are in given position comprise a limit switch S5 provided on the main frame in a position to be closed when the lift is down and the ring drum is in its top position. In series with the switch S5 there are limit switches S6A and S6C which are closed when the shell ejector heads for cope and drag are down. The coil of a relay R10 is in series with switches S5, S6A and S6C, so as to be energized when they are all closed. When energized, the relay R10 closes two switches R10-1 and R10-2 which are in the lines respectively from timer switch TMA-2 to solenoid coil VC-9 or from timer switch TMC-2 to solenoid coil VC-3.

The timer TMB has a switch TMB-1 which, when closed, completes a circuit to the forward relay R5 of the ring drum motor MD to cause the ring drum to turn from its top position to its upside down position.

Another switch TMB-2, when closed, energizes the solenoid coil VC-6 of cylinder 136 to cause the upper sand gates to open for a predetermined time to discharge a batch of sand mixture down upon the lower sand gates.

Another switch TMB-3, when closed, energizes the solenoid coil VC-5 of cylinder 147 to open the lower sand gates and discharge the batch of sand mixture upon the pattern (cope or drag) positioned therebelow.

Another switch TMB-4, when closed, energizes the solenoid coil VC-4 of cylinder 59 to cause the lift to be raised to its upper position to place a pattern in proper location to receive a batch of sand mixture thereon.

The heaters 190 for the patterns may be kept on continuously or for such part of the time as is needed to keep them at a uniform temperature. The wiring diagram shows them to be provided with means for controlling their temperature. For example, a thermo-couple 201 may be placed on or near the pattern (cope or drag) and, through a pyrometer instrument 202, these thermo-couples will operate a relay R11 or R12 for drag or cope, respectively. The relays R11 and R12 operate switches R11-1 and R12-1 for the heating means 190 for the drag and cope respectively.

*Operation*

Figure 22:
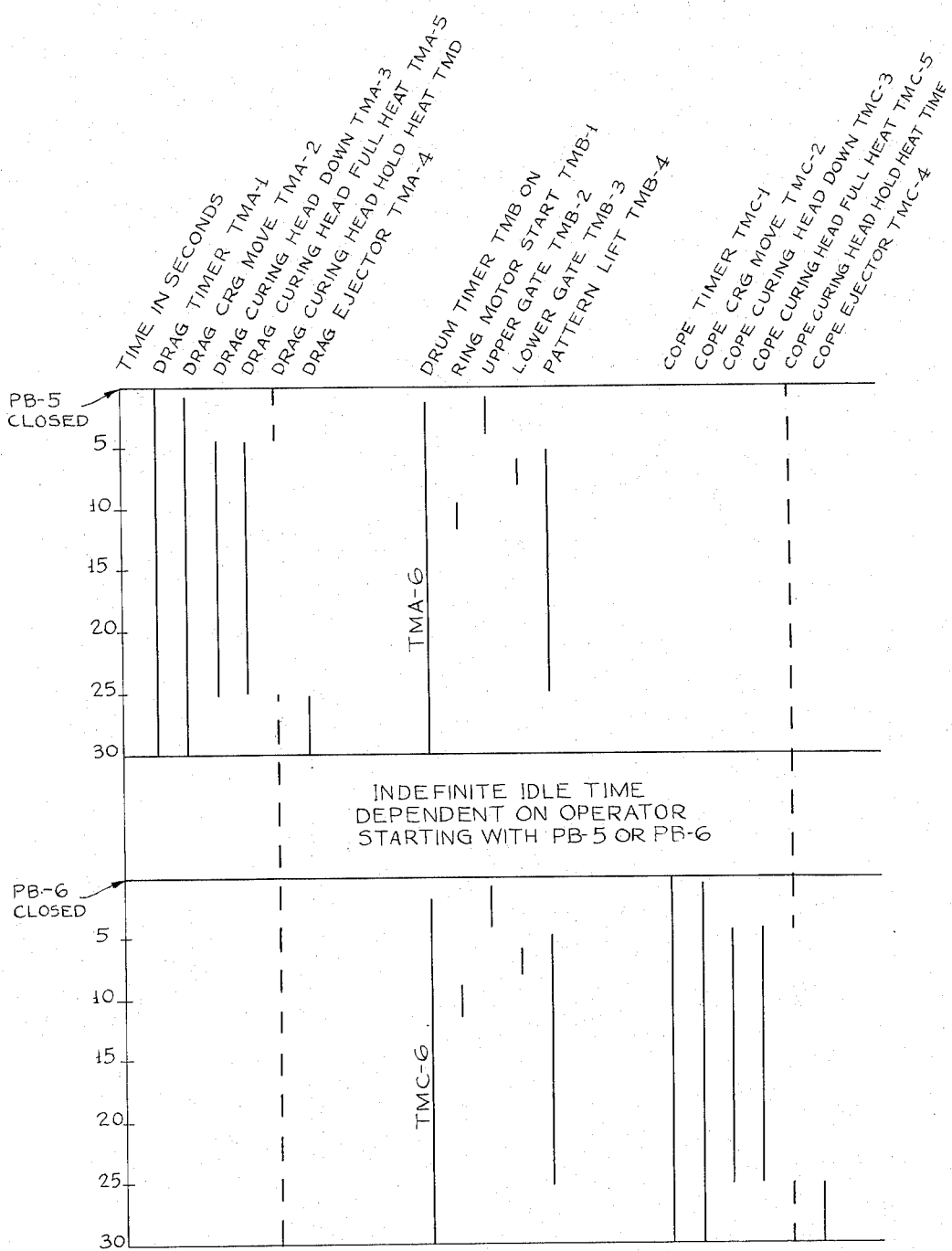
Fig. 22 is a timing diagram.
Figure 29:
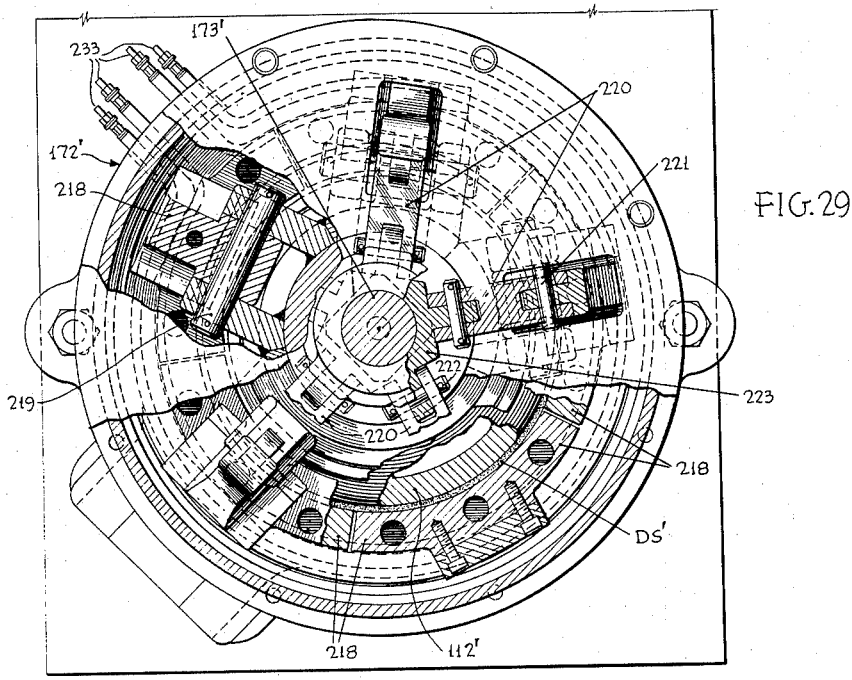
Fig. 29 is a horizontal plan view taken on the line 29—29 of Fig. 27, but with some parts broken away in section, showing drag shell back shaping mechanism.
Figure 30:
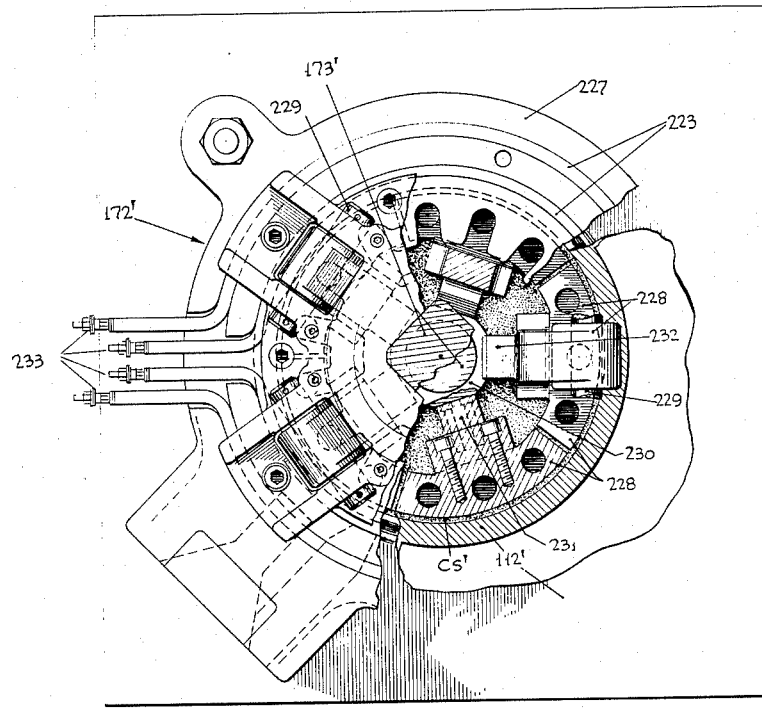
Fig. 30 is a horizontal plan view taken on the line 30—30 of Fig. 27, but with parts broken away in section, showing cope shell back shaping mechanism.

The operation of the apparatus will largely be clear from the above description and wiring diagram, Fig. 21, but a brief review of the operation will be given in connection with the timing diagram, Fig. 22.

It will be assumed that there is a supply of sand mixture in the hopper and that the elevating conveyor and screw conveyor are operating. It will also be assumed that the parts are in the position shown in Fig. 8 with the drag pattern carriage ready to be moved over to the central station B on the drum to receive a charge of sand. The cope pattern is shown to have a shell formed thereon from previous operations and this will be cured and ejected.

The operator pushes push-button PB-6 at the cope curing end C of the machine. Relay switch R9-2 is assumed to be closed due to the drum being in its upper position to close limit switch S3B and open S3A; and limit switch S4A is assumed to be closed due to the carriages being over toward the drag curing end A of the machine. Further, it is assumed that limit switches S6A and S6C are closed due to the cope and drag ejector plungers or rams being down; and that limit switch S5 is closed due to the lift on the drum being in the bottom position.

Closure of PB-6 starts the timer TMC into operation and simultaneously energizes its clutch-engaging coil TMC-C to start operation of its timing switch actuating means. This mechanism has previously been returned automatically to zero position after the stoppage of the timer following the preceding operation. As soon as the period timing mechanism of TMC begins to operate it closes switch TMC-1 which locks the timer in circuit for the duration of the period for which TMC-1 has been set.

Timer TMC closes its switch TMC-6 to start into operation the timer TMB for the central station mechanism.

Timer switch TMC-2, when closed, causes the cope carriage to be moved out to the cope shell curing station C. This causes the drag carriage to be moved in from station A to the filling position on the drum at station B, as shown in Fig. 9.

Timer TMC, by actuation of its switches TMC-3, TMC-4 and TMC-5, respectively, causes the cope curing head to move down; starts its high heat timer; and, after curing and return of the curing head, causes operation of the cope shell ejecting ram. As stated above, timer TME, which is continuously energized for periodic heating, keeps some heat on the drag head at times other than the curing period.

The downward movement of the curing head 172 is limited by adjustable rods 176 (Fig. 20) and the head is returned upward automatically as soon as its valve solenoid coil is de-energized.

Timer TMB, by actuation of its switches TMB-4, TMB-2, TMB-3 and TMB-1, respectively, causes the pattern carriage on the drum to be raised into filling position; causes the upper sand gates to open and close; causes the lower sand gates to open and close; and starts the drum motor into operation. The drum moves into an upside down position and pauses long enough for excess sand to be dumped out; and then returns to upright position through the action of its bottom limit switches S2B, S2A, closure of S2B and opening of S2A causing reversal of the drum motor. Top limit switches S3B, S3A reverse their positions as the drum moves out of top position and assume their normal position, as shown in Fig. 21, when the drum is again in its top position. After the drum returns to top position switch TMB-4 opens and the carriage is returned to lower position on the drum ready to be run out to the curing station.

At all times the patterns are kept heated by their heating elements 190 and their temperature is kept regulated by their heat responsive elements 201 and pyrometers 202.

When the operator is ready for the drag-curing operations to start, he pushes the button PB-5 at the other end of the machine to set into action a series of timed events with timers TMA and TMB, which parallel those just described for the cope-curing cycle. Of course, the sand mixture on the drag pattern has been curing because the pattern has been filled and is always kept hot, but the slight difference in total time of cure in normal operation will not matter because there is a considerable time range before over-curing is encountered. For large production operations, of course, the operation of the starting push-buttons PB-5 and PB-6 might be placed under the control of the carriages instead of the operator, as are limit switches S4A and S4C, leaving the operator merely to supervise the action of the machine; but conjoint manual and automatic operation has given satisfactory results.

Fig. 8 shows the drag carriage ready to be moved in on the drum for filling, the cope pattern having a shell thereon ready to be back-cured.

Fig. 9 shows the drag pattern moved in on the drum. The cope pattern is shown at the curing station C. The upper gates 124 have opened to pass a charge of sand to the lower gates and have closed again.

Fig. 10 shows the drag pattern to have been raised by the lift on the drum into filling position and the lower gates to have been opened to deposit the charge of sand on the drag pattern.

Fig. 11 shows the lower gates closed.

Fig. 12 shows the drum turned upside down to dump out excess sand, leaving a shell of the desired thickness fused on the pattern.

Figure 13:
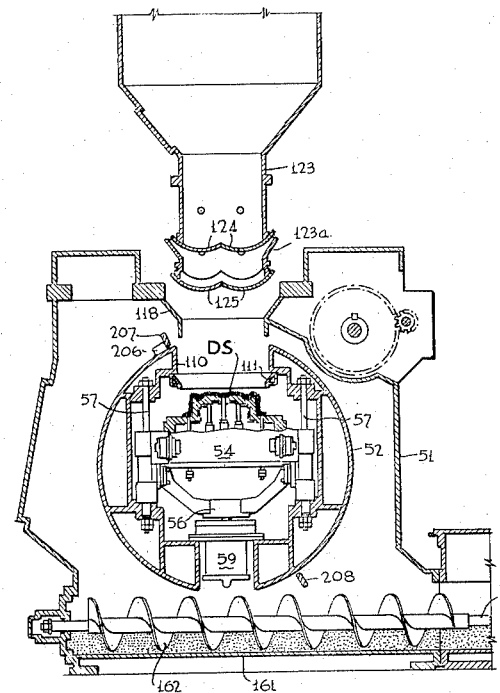
Fig. 13 is a view like Figs. 7 and 10, but showing the parts at another stage of operation.

Fig. 13 shows the drum turned back to upright position and the drag pattern lowered ready for the carriage to be run out to back-curing position.

Figure 14:
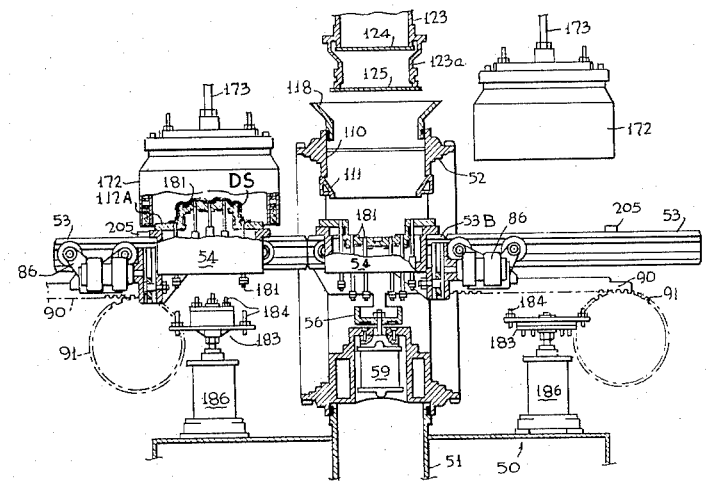
Fig. 14 is a view like Fig. 8, but showing the parts in another stage of operation.

Fig. 14 shows the drag carriage run out to curing station A and the curing hood brought down into back-heating position. The cope pattern carriage has been run back in on the drum ready for filling.

Figure 15:
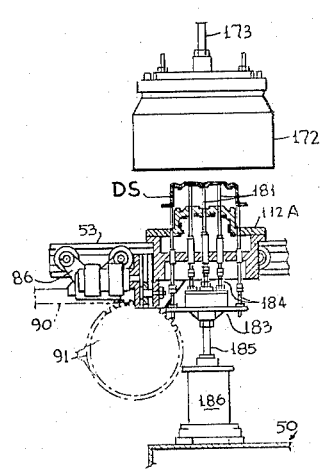
Fig. 15 is a partial view like Fig. 8 but showing the parts at another stage of operation.

Fig. 15 shows the drag hood raised and the ejector ram operated to remove the drag shell from the pattern. As soon as the operator takes it off he can start a new cycle, the cope pattern filling operations on the drum having been completed in the meantime.

It has been noted that the adjustable stop screws 107 limit the movement of the carriage-operating rack bars 86 but because of unavoidable loose motion in the carriage operating mechanism it is also necessary to limit precisely the end stopping positions of the carriages themselves. For this purpose, as shown in Figs. 3, 4, 8, 9 and 14, the track at either end is provided with a stop 205 for the carriage.

It has also been noted that the rotational movement of the drum is stopped by limit switches S3B, S3A at the top and by limit switches S2B, S2A at the bottom. Because of rotational inertia and in spite of the slowing effect of the clutch-brake device MD-B of the drum turning motor MD, it is necessary to provide means for stopping the drum precisely in final positions. For this purpose, as shown in Figs. 7, 10, 12 and 13, the drum is provided with a lug 206 which in final positions engages stops 207 or 208.

*Casting with shell of first embodiment*

Figs. 23 to 25 show the rough-backed shells made according to the first embodiment used for casting. The cope shell CS is shown in Fig. 24 and the drag shell DS is shown in Fig. 23. A brake drum disk 210 has been placed in the drag shell in position to have its outer edges embedded in the cast metal of the drum. The drag shell is provided with projections DS1 which fit in sockets CS1 of the cope shell to hold the shells in proper position when assembled.

A gate DS2, CS2 leads to grooves DS3, CS3 and DS4, CS4 which direct metal into the bottom of the drum cavity by way of openings DS5. Grooves DS3 and DS4 are connected by transverse channels DS6 which slow the flow of metal and serve as a strainer. Vent openings CS7, DS7 at the top of the metal space serve to remove gases during pouring.

Fig. 25 shows the two shells being brought together during assembly.

Fig. 26 shows the shells after assembly in a casting box 211 with heat conductive backing particles, like shot or pebbles 212 supporting the shell assembly. The drum casting which is formed about the outer edges of the disk 210 is designated by the numeral 213.

Second embodiment

The second embodiment, shown in Figs. 27 to 30, and, in the casting stages, in Figs. 31 and 32, is very similar to the first embodiment insofar as the general shell forming apparatus is concerned and the same reference characters, with a prime (') added, will be used on the drawings for such common apparatus as is shown.

The main feature which characterizes the second embodiment is that after the shell has been fused on a pattern and the pattern carriage moved to back-curing position, the back is heated by a back-shaping pattern instead of being left rough.

The shells are shaped and cured on the back by curing heads 172' which are moved up and down by piston rods 173' of cylinders 174'. Pressure is required on the curing heads, so to take the reaction of this pressure, the cylinders 174' are connected to the base frame 50' by tie rods 215.

The curing head 172' for the drag shell comprises an inner portion 216 which presses upon the central portion of the shell, an outer annular portion 217 which presses upon the outer flange of the shell, and a plurality of distensible clamping elements 218 which are squeezed inward radially after the portions 216 and 217 have been seated on the shell. The elements or members 218 are pivoted on pins 219 and are forced in and out by links 220 hinged by pins 221 to the upper ends of members 218 and hinged by pins 222 to a collar 223 carried on the piston rod 173'. The lower end of rod 173' has loose motion in the main body of the head 172' whereby to carry the head, operate the links 220, and finally to press down on the portions 216 and 217 and also on the members 218. The downward movement of the curing head is limited by a spacer 224 on the pattern 112'.

The arrangement for the cope is similar to that of the drag except that the distensible portion must expand instead of contract. It comprises the head 172' having an outer portion 227 and expansible elements 228 pivoted on pins 229. The elements or members 228 are pressed outward by a cam 230 carried on the lower end of the piston rod 173' which engages cam lugs 231 on the members 228. The piston rod 173' has free movement in the head 172' to perform this camming action and the cam 230 has a shoulder on its upper end which engages lugs 232 on the member 228 for retracting them when the piston returns upward.

Heating elements, generally designated for both cope and drag heads by the numeral 233, are secured thereon by suitable means, as shown.

The patterns have ejector pins, as in the first embodiment, but these are omitted to aid the illustration of the parts which are new in the second embodiment.

Casting with shells of second embodiment

In casting, as shown in Figs. 31 and 32, the shells CS' and DS' fit in metal backing elements 238, 239 which fit the shape produced by and replace the back-shaping elements of the heating heads of the shell-forming apparatus just described. Dowel pins 240 of element 238 fit in socket holes 241 of the element 239 to position the elements properly during assembly. The elements 238 and 239 are held together after assembly by hooks 242 and pins 243. Adequate air vent grooves and holes, generally designated by the numeral 244, relieve gases passing through the gas-porous shells.

The final integral assembly of disk 210' and cast drum 213' is shown in Fig. 32. The shells themselves interiorly are essentially like those of the first embodiment and need not be described again.

Third embodiment

The third embodiment, shown in Figs. 33 to 36, and, in the casting stages in Figs. 37 to 41, is similar to the first and second embodiments insofar as the general shell forming apparatus is concerned and the same reference characters, with a double prime (") added, will be used on the drawings for such common parts as are shown.

The main feature which characterizes the third embodiment is that the shell is formed between a face pattern and a back pattern and that the shell is removed from the face pattern as usual but that the back pattern remains on the shell to support it until the casting has been poured. Looked at another way, instead of using a back-shaping pattern at the curing station and removing it and replacing it by a back-supporting form during casting, as in the second embodiment, there is provided in the third embodiment a considerable number of backing forms and for each shell which is made one of these backing forms is placed on the face pattern and the shell is formed on it and remains on it throughout the life of the shell.

Figure 33:
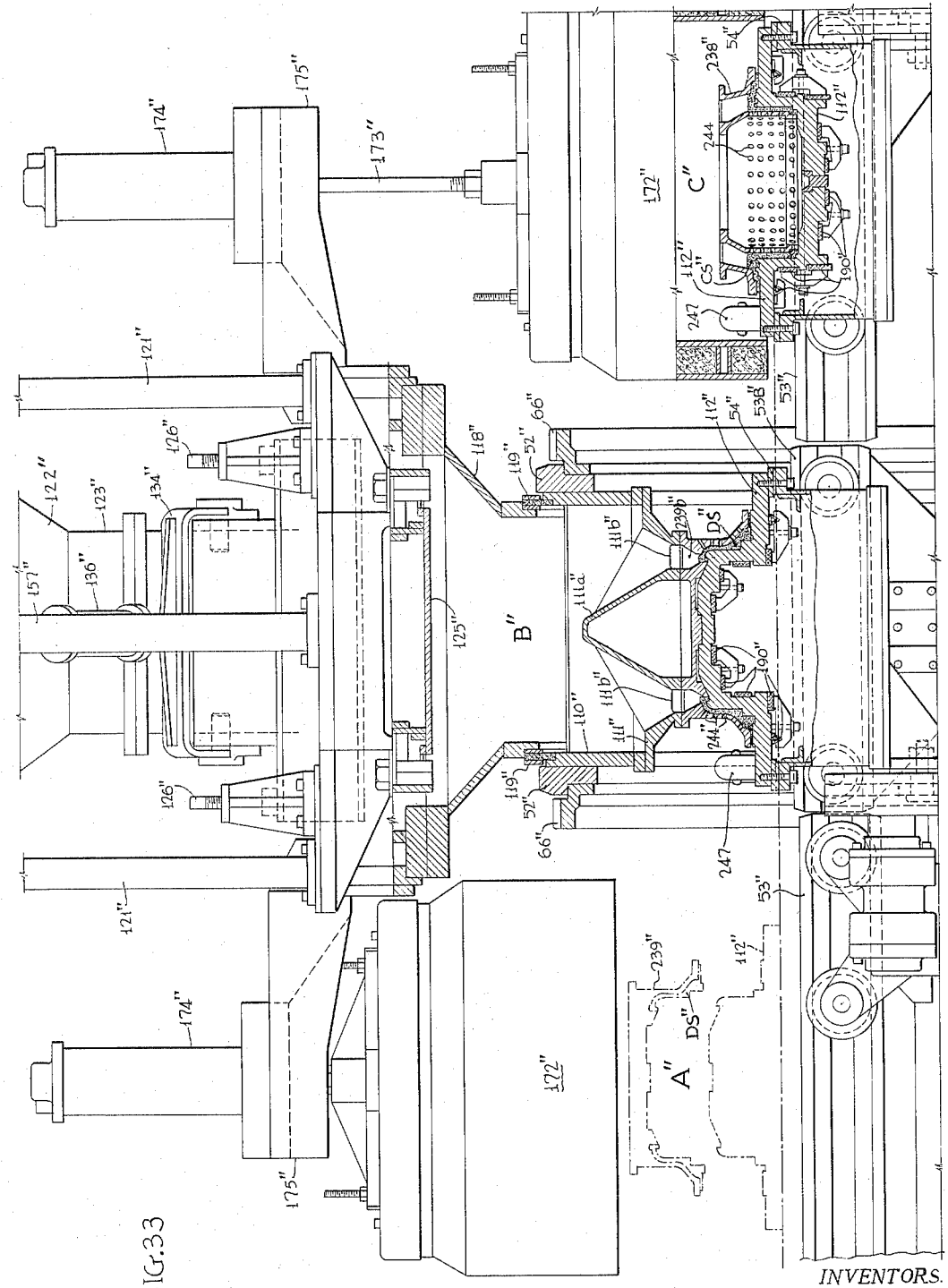
Fig. 33 is a vertical longitudinal section similar to Fig. 9 but showing a third embodiment of shell forming apparatus.

As shown in Figs. 33 and 34, there is placed on a face pattern 112" at a curing station, A" or B", a shell backing member which for the cope is designated as 238" and for the drag as 239". The backing member is properly positioned by parts which interfit with mating parts on the carriage pattern and which are held down on the carriage pattern by suitable means. Figs. 37 and 38 show notches 238a", 239a" respectively for cope and drag backing members for fitting with mating parts on the carriage patterns.

At the right of Fig. 33 a drag backing member 239" with a drag shell DS" is shown in dotted lines being removed from the carriage drag pattern. A new backing member will be placed on the carriage drag pattern while the carriage is in the same position. In the same figure such an assembly is shown in full lines at the filling station on the drum with a shell just formed thereon. A cope shell CS" is shown being cured at station C" by the curing head 172" in its lower position.

The curing heads 172" are quite similar to those of the first embodiment and need not be described in detail. It will be understood that the backing pattern members 238", 239" are in preheated condition when placed on the machine and that the curing heads heat the shells through these backing members. If operations are sufficiently rapid the backing pattern members may be returned hot from the casting operation; if not, they will be preheated by suitable means.

The backing pattern members are provided with annular filling spaces 238b", 239b" which coincide with an annular filling space 111b" in the modified funnel ring 111". A cone 111a" is provided on the funnel ring to direct the sand outward to the annular openings. Suitable spider elements hold the parts together across the annular openings 111b", 238b" and 239b".

To assist the flow of sand mixture into the patterns they are vibrated vigorously, as by vibrators 247 mounted on the carriage patterns and activated while filling.

In Fig. 34 the carriages are shown in reverse position to that shown in Fig. 33, with the scope pattern after filling on the drum and the drag shell being cured at station A". In dotted lines the finished cope shell CS" with its backing pattern member 238" is shown being removed at station C". A new backing pattern was placed on the cope pattern before it was returned to the drum for filling.

As in the other forms, the shells are ejected from the carriage patterns by ejector means similar to that shown for the first embodiment, but such ejector means are omitted here for the better illustration of those parts which are different in the third embodiment.

In Fig. 34 the gas venting holes 244″ in the backing members 238″, 239″ are shown.

*Casting with shells of third embodiment*

In casting, as shown in Figs. 37 to 41, the shells CS″ and DS″ together with their backing pattern members 238″ and 239″ are brought together, as shown in Fig. 40, a drum disk 210″ and a strainer 248 first having been assembled with the drag shell, ready for pouring. In this case the parts are placed in a horizontal position instead of in a vertical position, as in the previous embodiments, and the drag backing member 239″ rests flat on the floor or a table. The parts may be clamped together, if desired, before pouring; but since the cope shell and backing member rest with considerable weight on the drag parts, this may be sufficient without clamps. The gate CS2″ in the cope shell is positioned above the strainer 248 carried on a seat in the lateral duct provided in the drag shell.

As shown in Fig. 35, the gate CS2″ is formed by a projection 249 on the cope carriage pattern 112″. A post 250 on the funnel ring 111″ prevents sand mixture from fusing on the upper end of the projection 249. As shown in Fig. 36, this gate-forming post and the opening around it are blanked off when a drag shell is being formed. The drag shell has a projection 251 which forms a seat to position the strainer 248 and to form a channel below it.

The completed drum with disk 210″ and cast drum 213″ thereon is shown in casting position in Fig. 41 and separately in Fig. 42.

*Conclusion*

It is thus seen that the invention provides efficient and convenient apparatus for forming mold shells for casting, which shells are suitably formed for effective backing during casting and which may carry their own backing members with them during the casting stage. The apparatus is largely automatic in operation, the attendant having only to remove a shell and press a start button for each cycle of operation. The controls are such that complete control of the time duration of most of the functions can be adjusted in a moment by hand. The sand mixture is well confined to avoid spilling or fusing at unwanted places and the apparatus is easily kept clean. The actions are rapid and a superior grade of shells is formed.

While certain embodiments of the invention have been illustrated and described to provide an understanding of the principles of the invention, it is to be understood that in various aspects there may be other embodiments within the general scope of the invention.

What is claimed is:

1. Molding apparatus comprising in combination, a turnably mounted drum, a track including a fixed section at each end of the drum and a movable section carried by said drum, two carriages mounted on said track each carrying a pattern, said carriages being adapted to move into said drum at times and to move out upon one of the fixed track sections at times, means for moving said carriages together in a fixed axial relationship to place one of their patterns in alternation in said drum while holding the other in fixed position on the track outside the drum, and means for supplying mold-forming material to a pattern carried by a carriage when positioned within said drum.

2. Molding apparatus comprising in combination, a turnably mounted drum, a track including a fixed section at each end of the drum and a movable section carried by said drum, two carriages mounted on said track each carrying a pattern, said carriages being adapted to move into said drum at times and to move out upon one of the fixed track sections at times, means for moving said carriages together in a fixed axial relationship to place one of their patterns in alternation in said drum while holding the other in fixed position on the track outside the drum, and means for supplying mold-forming material to a pattern carried by a carriage when positioned within said drum, said carriage moving means comprising a common power device and rack and gear connections from the power device to the opposite outer ends of said carriages.

3. Molding apparatus comprising in combination, a turnably mounted drum, a track including a fixed section outside the drum and a movable section carried by said drum, a pattern carriage mounted to move longitudinally along said track, said carriage including two sections and a turnable and transversely slidable retaining coupling between them, means engageable with one carriage section for moving it along the track and holding it in different positions along the fixed track section, the other carriage section moving with the one said carriage section and having movement along both the fixed and movable track sections, the coupling between carriage sections providing turning and transverse movement of said other carriage section on the drum while said one carriage section is disposed in the fixed track section in a fixed longitudinal position and is holding said other carriage section in proper longitudinal position on said drum.

4. Molding apparatus comprising in combination, a turnably mounted drum, a track including a fixed section outside the drum and a movable section carried by said drum, a pattern carriage movably mounted on said track, said carriage including a first section carrying the pattern and having movement along both the fixed and movable track sections and a second carriage section having movement only along the fixed track section, means on said drum for moving the track section thereon transversely relative to the track and drum axes, the drum also turning on its own axis with the movable track section and carriage section thereon, and said carriage sections having a transversely slotted and rotatable coupling connection therebetween for keeping the carriage sections together in proper longitudinal position when the movable carriage section is moved transversely and rotated on said drum.

5. Molding apparatus comprising in combination, a turnably mounted drum, a track including a fixed section outside the drum and a movable section carried by the drum, a pattern carriage movable along said track, means on said drum for moving the movable track section thereon transversely relative to the drum axis, means above the drum for supplying a mold forming material to a pattern on a carriage, the material forming a shell on the pattern, means for inverting the drum to dump excess material off the pattern and to return the drum to upright position, the carriage and pattern being moved out on the fixed track section when brought back to proper position by the drum, and means located along the fixed track section for curing the shell formed on the pattern.

6. Molding apparatus comprising in combination, a turnably mounted drum, a track including a fixed section outside the drum and a movable section mounted on the drum, a pattern carriage mounted for movement along said track, a filling ring carried by said drum, means for producing relative movement between the ring and pattern when its carriage is on the drum track section to bring them together in position for sealing the space between them for feeding material upon the pattern when the drum is in upright position, means above the drum for supplying mold forming material to the ring and pattern, the material forming a shell on the pattern, means for turning the drum with its track section and the carriage with its pattern to upside down position to dump excess material from said pattern, the drum then turning back upright and the filling ring and pattern being separated, means for moving the carriage and pattern out on the fixed track section, and means located along the fixed track section for curing the shell formed on the pattern.

7. Molding apparatus comprising in combination, a drum mounted for turning movement from a vertical position to an inverted position, a track including a fixed section at one end of the drum and a movable section mounted on said drum, a carriage carrying a pattern mounted to move along said track, means on said drum for moving the carriage and the movable track section transversely relative to the drum axis, means for supplying mold forming material upon the pattern in upright position when the carriage is moved transversely, means for turning the drum upside down to dump excess material from the pattern and to turn the drum upright again, means for moving the carriage from the movable track section to the fixed track section, and means located along the fixed track section for curing the back of the shell formed on the pattern.

8. Molding apparatus comprising in combination, a track including a fixed section and a movable section, a mount carrying the movable track section, said mount being mounted for turning movement about an axis parallel to the length of the track, a pattern-carrying carriage movable along said track, means for supplying mold forming material to said pattern when the carriage is on the movable track section on the mount, the mount with its track section and carriage being inverted to remove excess material from the pattern after a shell of material has formed thereon, the mount and carriage being thereafter returned to upright position to realign the track sections, the carriage then being moved out onto the fixed track section, and means located along the fixed track section for curing the mold shell formed on the pattern.

9. Molding apparatus comprising in combination, a filling drum rotatable about a horizontal axis, a track disposed parallel to the axis of said drum, said track including fixed sections at each end of the drum and a movable section within the drum, a filling opening in the top of the drum, two carriages carrying heated shell face-shaping patterns thereon mounted for movement along said track, shell back-treating means located above the fixed track sections at each end of the drum, means for conjointly moving said carriages along the track, each between a charging position on the movable track section on the drum and a respective one of said back-treating means, means on said drum for moving said movable track section with a carriage thereon transversely away from a normal position in which all track sections are in alignment to place the face pattern in filling position at the lower end of the filling opening on said drum, means for feeding a charge of material to a pattern when brought to said filling opening while the drum is in vertical position, means for turning the drum upside down to dump out excess material which does not fuse into a shell on a pattern and for turning the drum back to upright position, and means for causing the return of the movable track and carriage to normal position on the drum after the drum is returned to upright position.

10. Molding apparatus comprising in combination, a filling drum mounted for rotation about a horizontal axis, a track extending through said drum along its axis, said track including sections at each end of the drum and a movable section carried by the drum, a filling opening in the side of the drum which is located at the top when the drum is in upright position, two carriages carrying heated shell face-shaping patterns thereon mounted for movement along said track, each pattern carriage being connected to move with the other and each being movable between a position on said drum and a given position along one of said end track sections, means on said drum for moving said movable track section transversely with a carriage thereon to place the pattern at the filling opening, means for charging heat-curing shell forming material on said pattern when located at said filling opening, means for inverting said drum while the pattern is at the filling opening to remove excess material from a shell which is fused on the pattern and for then returning the drum to vertical position, the movable track with the carriage and track being returned to normal position when the drum is returned to vertical position, a material holding hopper above the drum, means for conveying material from beneath the drum to the hopper, and means at the given positions along said end track sections for imparting a finishing operation to a shell carried on a pattern.

11. Molding apparatus comprising in combination, a filling drum rotatable about a horizontal axis, a track extending through said drum along its axis, said track having a section at each end of the drum and a section mounted in said drum for transverse movement relative to the drum axis, a filling opening in the top of the drum, a plurality of carriage units mounted on said track for movement therealong, a coupling between said carriage units providing relative transverse movement and turning movement between them, a heated shell face pattern carried on one of said carriage units, the pattern carrying carriage unit being positioned on the drum track section when the other coupled carriage unit is positioned on a track section at the end of the drum, means for raising a pattern on the drum to a position at the filling opening, means for depositing material on the pattern whereby to fuse a shell thereon, means for turning the drum upside down to dump excess material from the pattern, means to turn the drum back to upright position, the pattern and movable track unit being returned to lowered position after the drum has been returned to upright position, the pattern carrying carriage unit then being movable to a finishing station on the track at one end of the drum, and means at said finishing station having relative transverse movement with respect to said pattern for finishing the shell after transverse movement toward the pattern, the finishing means and pattern being separated after the finishing action.

12. Molding apparatus comprising in combination, a heated face shaping pattern, means for supplying heat-curing material to the hot pattern to cause a mold shell to form thereon and for causing excess unfused material to be removed from the back of the shell, and means for heat-curing the back of the shell while it is disposed on the pattern, said back-curing means comprising a heated back-shaping pattern engaging the back of the shell, said shell back-curing means comprising at least a portion which is laterally distensible so as to expand or contract to shape side faces on the back of the shell and to be removed after the shell has been formed, the pattern-shaped back of the shell being adapted to seat a fitting metal backing member for support during casting operations.

References Cited in the file of this patent

UNITED STATES PATENTS

| 2,423,151 | Miller | July 1, 1947 |
| 2,588,669 | Taccone | Mar. 11, 1952 |
| 2,630,608 | Granath | Mar. 10, 1953 |
| 2,659,945 | Valyi | Nov. 24, 1953 |
| 2,691,196 | Banister | Oct. 12, 1954 |
| 2,695,431 | Davis | Nov. 30, 1954 |

FOREIGN PATENTS

| 832,934 | Germany | Mar. 3, 1952 |

OTHER REFERENCES

Foundry, September 1952, pages 108–111.
Fortune, July 1952, pages 104–106, 140, 143.
The Iron Age, April 1951, pages 81–85.